United States Patent
Kuttler et al.

(10) Patent No.: US 7,966,895 B2
(45) Date of Patent: *Jun. 28, 2011

(54) IN-LINE MEASURING DEVICE

(75) Inventors: Daniel Kuttler, Basel (CH); Alfred Rieder, Landshut (DE); Hao Zhu, Freising (DE); Christof Huber, Bern (CH)

(73) Assignee: Endress + Hauser Flowtec AG, Reinach (CH)

( * ) Notice: Subject to any disclaimer, the term of this patent is extended or adjusted under 35 U.S.C. 154(b) by 0 days.

This patent is subject to a terminal disclaimer.

(21) Appl. No.: 12/588,180

(22) Filed: Oct. 6, 2009

(65) Prior Publication Data

US 2010/0095785 A1 Apr. 22, 2010

Related U.S. Application Data

(60) Provisional application No. 61/136,813, filed on Oct. 6, 2008.

(30) Foreign Application Priority Data

Oct. 6, 2008 (DE) .......................... 10 2008 050 116

(51) Int. Cl.
*G01F 1/84* (2006.01)
(52) U.S. Cl. ................................. 73/861.356
(58) Field of Classification Search ............. 73/861.355, 73/861.356, 861.357
See application file for complete search history.

(56) References Cited

U.S. PATENT DOCUMENTS

| | | | |
|---|---|---|---|
| 5,027,662 A | 7/1991 | Titlow |
| 5,907,104 A | 5/1999 | Cage |
| 5,926,096 A | 7/1999 | Mattar |
| 6,327,914 B1 | 12/2001 | Dutton |
| 2008/0066521 A1 | 3/2008 | Logue |

FOREIGN PATENT DOCUMENTS

| | | |
|---|---|---|
| DE | 10 2004 021 690 | 11/2005 |
| WO | WO 2007/040468 | 4/2007 |

OTHER PUBLICATIONS

U.S. Appl. No. 12/588,179 Daniel Kuttler Oct. 6, 2009.*

* cited by examiner

*Primary Examiner* — Jewel Thompson
(74) *Attorney, Agent, or Firm* — Bacon & Thomas, PLLC

(57) ABSTRACT

An in line measuring device, includes a measuring transducer of the vibration-type having: at least one measuring tube vibrating, at least at times, during operation, and serving for conveying, at least at times, a two- or multiphase, flowable medium; an exciter mechanism acting on the measuring tube for producing vibrations of the at least one measuring tube; and a sensor arrangement for registering vibrations of the at least one measuring tube and for delivering at least one oscillation measurement signal representing oscillations of the measuring tube. The in line measuring device further includes measuring device electronics electrically coupled with the measuring transducer. The measuring device electronics delivers, at least at times, at least one exciter signal driving the exciter mechanism, and, at least at times, ascertains a damping value of first type, which represents a change of damping opposing the vibrations of the measuring tube within a predeterminable time interval.

49 Claims, 7 Drawing Sheets

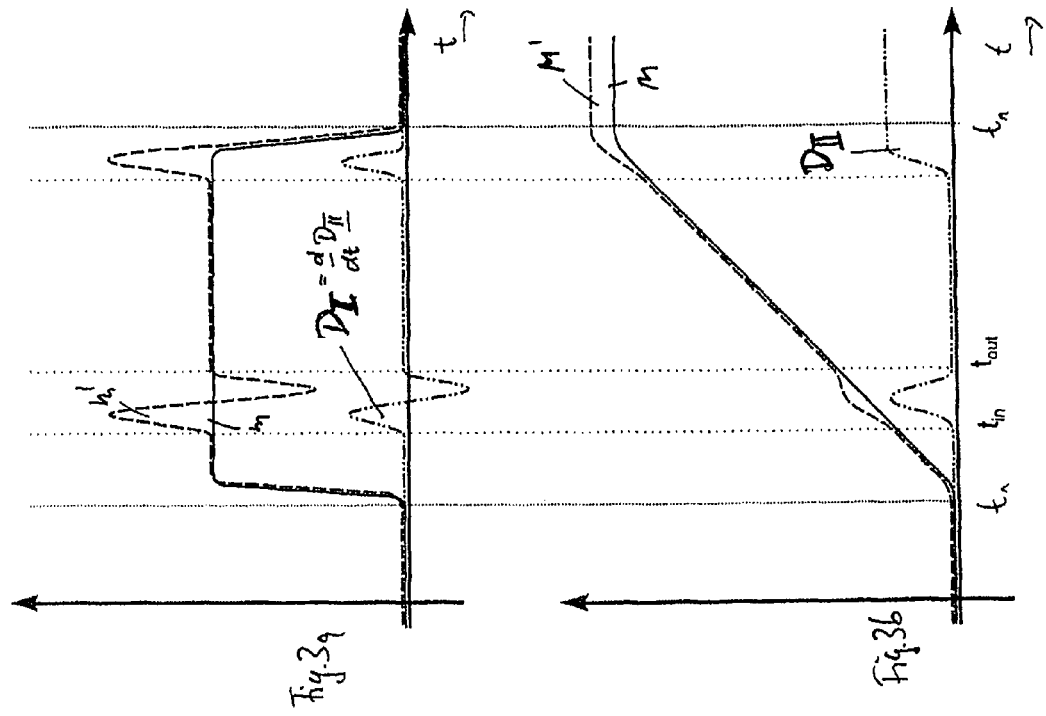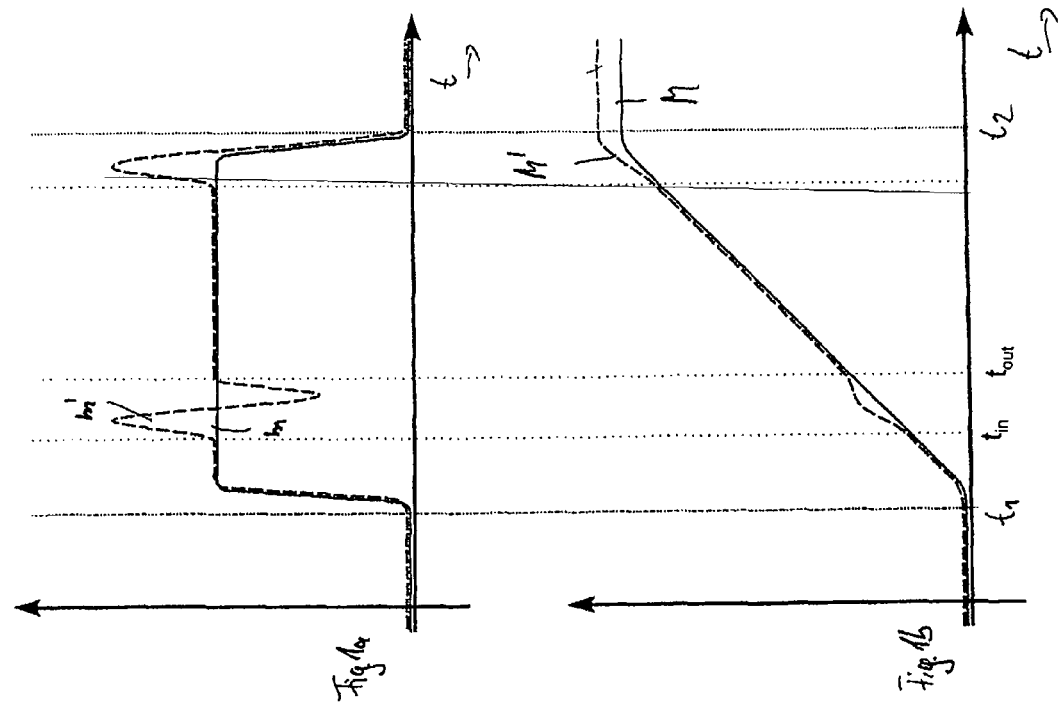

IN-LINE MEASURING DEVICE

CROSS-REFERENCE TO RELATED APPLICATION

This application is a non-provisional application of provisional application No. 61/136,813 which was filed on Oct. 6, 2008; and is related to U.S. patent application Ser. No. 12/588,179 filed on Oct. 6, 2009, and to U.S. patent application Ser. No. 12/588,178 filed on Oct. 6, 2009.

TECHNICAL FIELD

The invention relates to an in line measuring device, especially an in line measuring device embodied as a Coriolis mass flow/density measuring device, having a measuring transducer of vibration-type for a medium flowing in a pipeline, especially a two- or multiphase medium.

BACKGROUND DISCUSSION

In industrial measuring and automation technology, in connection with the control of automated filling processes of flowable media, such as, for instance, powder, granular material, liquids or pastes, filling machines embodied as line fillers or rotary fillers are applied, such as illustrated, for example, in CA 2,023,652, DE A 10 2006 031969, EP A 893 396, EP A 405 402, U.S. Pat. Nos. 7,114,535, 6,474,368, 6,026,867, 5,975,159, 5,865,225, 5,595,221, 4,588,001, 4,532,968, 4,522,238, 4,053,003, U.S. Pat. No. A 3,826,293, U.S. Pat. No. 3,519,108, US A 2006/0146689, US A 2003/0037514, WO A 08/034,710, WO07/048,742, or WO A 04/049641. In such filling machines, the containers, for example, bottles, ampoules, cups, glasses, cans or the like, which are to be filled with a charge of the respective medium, such as, for instance, a pasty or doughy food, a solvent, a lacquer or a paint, a cleaning agent, a drink, a medicine or the like, are supplied one after the other via a corresponding feed system to the filling machine. The actual filling procedure occurs during a period of time in which the particular container is located within a filling location installed on the filling machine below a filling tip dispensing the medium. Following the filling with an, as much as possible, highly precisely metered charge of the medium, the containers leave the filling machine and are automatically conveyed further. Typical throughput rates of such filling machines can lie quite well in the order of magnitude of 20,000 containers per hour.

For precisely ascertaining the volume of medium actually metered in each case, often applied in filling machines are in line measuring devices, which highly accurately ascertain the charge to be metered during the corresponding filling procedure by means of directly measured and internally totalized flow rates of the medium, as it is allowed to flow through a measuring transducer of the measuring device serving for physical-to-electrical transducing of the measured variable to be registered. These in line measuring devices then output, especially in real time, in the form of a primary measured value of the measuring device, especially a primary measured value formatted corresponding to the requirements of the bottling process, for example, to a superordinated programmable logic controller (PLC), in order so to enable a correspondingly exact, as were it, also fast and robust control of the bottling process, which is, most often, operated in batch mode. The measuring transducer is, for such purpose, correspondingly connected via in- and outlet side, most often standardized, connection elements, for example, screw connections or flanges, to a line segment supplying medium to be measured, or a line segment removing a measured medium, of a pipeline system of the filling plant conveying the medium during operation. In case required, there serve, besides the usually rigidly formed line segments, additionally extra holding apparatuses for affixing the measuring device within the filling machine.

The actual filling procedure and, associated therewith, the actual measuring cycle, in which medium to be measured flows through the measuring transducer, can last, in the case of filling processes run in batch operation, from a few seconds down to greatly less than a second. Preceding the measuring cycle wherein the charge is filled, and, accordingly, also following such, the measuring transducer resides in a ready state, during which no medium flows through the measuring transducer, and, thus, no medium is metered.

Because of their very high accuracy of measurement, even in the case of comparatively strongly fluctuating flow rates, especially also in filling processes operated discontinuously and/or in batch operation, as well as also a comparatively good reproducibility of the measured values delivered under such conditions, in spite of this, very near in time, such as, for example, also explained in the Durchflusss Handbuch (Flow Handbook), 4th edition 2003, ISBN 3-9520220-3-9 in the section "Abfuell- und Dosieranwendungen (Filling and Metering, or Dosing, Applications", page 213 ff., as well as in the patent literature, U.S. Pat. Nos. 7,302,356, 5,975,747, WO A 00/057325 or WO A 08/034,710, in line measuring devices, especially in line measuring devices embodied as Coriolis mass flow measuring devices, are applied, which, by means of a measuring transducer of vibration-type and a thereto connected, measuring device electronics, accommodated most often in a separate electronics housing, induce in the flowing medium reaction forces, for example, Coriolis forces, accelerating forces, frictional forces or the like, and, derived from these, produce at least one measurement signal correspondingly representing the at least one measured variable, for example, a mass flow, a density, a viscosity or another process parameter. Construction and operation of flow rate measuring, in line devices of the type being discussed, equipped with a measuring transducer of vibration-type are, moreover, sufficiently known to those skilled in the art. Examples of such in line measuring devices, especially also in line measuring devices embodied as Coriolis mass flow measuring devices, equipped with a measuring transducer of vibration-type or, however, also individual components thereof, such as, for instance, the measuring transducer, as well as also their special application, are described at length and in detail, besides in the already mentioned state of the art, in, among others, WO A 99/40 394, WO A 99/39164, WO A 98/07009, WO A 95/16897, WO A 88/03261, WO A 08/059,015, WO A 08/013,545, WO A 08/011,587, WO A 07/005,024, WO A 06/127527, WO A 06/104690, WO A 06/062856, WO A 05/093381, WO A 05/031285, WO A 05/003690, WO A 03/095950, WO A 03/095949, WO A 02/37063, WO A 01/33174, WO A 01/02 816, WO A 00/57141, WO A 00/14 485, U.S. Pat. Nos. 7,392,709, 7,360,451, 7,343,253, 7,340, 964, 7,299,699, 7,296,484, 7,213,470, 7,213,469, 7,181,982, 7,080,564, 7,077,014, 7,073,396, B7,040,180, 7,040,181, 7,040,179, 7,017,424, 6,920,798, 6,910,366, 6,895,826, 6,883,387, 6,880,410, 6,860,158, 6,840,109, 6,810,719, 6,805,012, 6,758,102, 6,705,172, 6,691,583, 6,666,098, 6,651,513, 6,564,619, 6,557,422, 6,519,828, 6,516,674, 6,513,393, 6,505,519, 6,471,487, 6,397,685, 6,330,832, 6,318,156, 6,311,136, 6,223,605, 6,168,069, 7,337,676, 6,092,429, 6,073,495, 6,047,457, 6,041,665, 6,006,609, 5,979,246, 5,945,609, 5,926,096, 5,869,770, 5,861,561, 5,796,012, 5,796,011, 5,796,010, 5,731,527, 5,691,485, 5,648,616, 5,616,868, 5,610,342, 5,602,346, 5,602,345, 5,531,126, 5,476,013, 5,429,002, 5,398,554, 5,359,881, 5,301,557, 5,291,792, 5,287,754, 5,253,533, 5,218,873, 5,095,761, 5,069,074, 5,050,439, 5,044,207, 5,027,662, 5,009,109, 4,962,671, 4,957,005, 4,911,006, 4,895,031, 4,876,898, 4,852,410, 4,823,614, 4,801,897, 4,777,833, 4,738,144, 4,733,569, 4,660,421, 4,491,025, 4,187,721, US A 2008/0190195, US A 2008/0189079, US A 2008/0189067, US A 2008/0141789, USA 2008/0092667, US A 2008/0047361, US A 2008/0011101, US A 2007/0186685, US A 2007/0151371, US A 2007/0151370, US A 2007/0144234, US A 2007/0119265, US A 2007/0119264, US A 2006/0201260, US A 2005/0139015, US A 2003/0208325, US A 2003/0131668 or the assignee's own, not pre-published DE102007062397.

Each of the therein illustrated measuring transducer comprises at least one, essentially straight, or at least one curved, measuring tube for conveying the, in given cases, extremely viscous or, however, also rather low viscosity, medium. In operation of the in line measuring device, the at least one measuring tube is caused to vibrate during operation, for the purpose of generating oscillation forms influenced by, among other things, the through flowing medium, especially its instantaneous mass flow. As excited oscillation form—the so-called wanted mode—in the case of measuring transducers with curved, e.g. U-, V- or Ω-shaped, measuring tube, usually that eigenoscillation form is selected, in the case of which the measuring tube executes bending oscillations about an imaginary bending oscillation axis of the measuring transducer extending essentially parallel to an imaginary longitudinal axis of the measuring transducer imaginarily connecting an inlet end of the measuring tube with an outlet end of the measuring tube or coinciding with such, so that it executes bending oscillations—in the manner of a kind of end clamped cantilever—in the form of pendulum-like movements essentially mirror symmetrically (in the following shortened to "symmetrically") about an imaginary central plane of the measuring tube at a lowest natural resonance frequency. In the case of measuring transducers with straight measuring tube, in contrast, for the purpose of producing mass flow dependent oscillation forms, often such a wanted mode is selected, wherein the measuring tube executes bending oscillations at least partially symmetrically about its aforementioned central plane, essentially in a single imaginary plane of oscillation, for instance, in the manner of a beam, or string, clamped on both ends. The imaginary central plane corresponds in both cases most often to that symmetry plane of the measuring tube, in given circumstances, also of the total measuring transducer, in which the cross section extending through the center of such measuring tube lies, and which symmetry plane is, thus, coplanar with this cross section.

As a result of such, for example, pendulum- or string-like, bending oscillations, as is known, Coriolis forces dependent on the mass flow, or the mass flow rate, are induced in the through flowing medium. These Coriolis forces, in turn, lead to the superimposing on the excited oscillations of the wanted mode, in the case of curved measuring tubes, thus, pendulum-like cantilever oscillations, thereto equal-frequency, bending oscillations of at least one likewise natural, second oscillation form, the so-called Coriolis mode. In the case of measuring transducers with curved measuring tube, these cantilever oscillations in the Coriolis mode driven by Coriolis forces correspond usually to that eigenoscillation form, in the case of which the measuring tube executes also rotary oscillations about an imaginary vertical axis directed essentially perpendicularly to the longitudinal axis. In the case of measuring transducers with straight measuring tube, in contrast, the oscillations in the Coriolis mode are formed, coplanarly with the wanted mode oscillations, as bending oscillations of equal oscillation frequency. For the mentioned case, in which oscillations serve as wanted mode, which are essentially symmetric with respect to the aforementioned central plane of the respective measuring tube, the oscillations of the measuring tube in the Coriolis mode are formed essentially anti- or point-symmetrically (in the following shortened to "antisymmetrically") with respect to the central plane of the measuring tube. Straight measuring tubes can, such as, for example, shown in U.S. Pat. Nos. 6,006,609 or U.S. Pat. No. 7,017,424, additionally also be excited to torsional oscillations about an imaginary longitudinal axis of the measuring tube, or the measuring transducer.

For exciting oscillations of the at least one measuring tube, measuring transducers of vibration-type have, additionally, an exciter mechanism driven, during operation, by an electrical exciter signal, e.g. in the form of a controlled electrical current, generated and correspondingly conditioned by a driver circuit of an associated measuring device electronics. The exciter mechanism excites the measuring tube to bending oscillations in the wanted mode by means of at least one electrical current driven, and, thus, electromechanical, especially electrodynamic, oscillation exciter acting, during operation, essentially directly on the measuring tube. Furthermore, such measuring transducers include a sensor arrangement with, especially electrodynamic, oscillation sensors for at least pointwise registering of inlet-side and outlet-side oscillations of the at least one measuring tube, especially the oscillations in the Coriolis mode, and for producing electrical sensor, or also oscillation measurement, signals serving, in each case, as a measurement signal of the measuring transducer influenced by the process parameter to be registered, such as, for instance, mass flow or density.

Due to the superpositioning of wanted and Coriolis modes, the oscillations of the vibrating measuring tube registered by means of the sensor arrangement on the inlet side and on the outlet side have a measurable phase difference also dependent on the mass flow. Usually, the measuring tubes of such measuring transducers, e.g. as applied in Coriolis mass flow meters and trimmed most often also to high oscillatory quality factors of far greater than 100, especially to 5000 or thereover, are excited, during operation, to an instantaneous natural resonance frequency of the oscillation form selected for the wanted mode, especially at an oscillation amplitude controlled to be constant and/or matched to the medium. Since this resonance frequency depends, especially, also on the instantaneous density of the medium, market-usual Coriolis mass flow meters can measure, besides the mass flow, supplementally, also the density of flowing media. Additionally, it is also possible, such as, for example, shown in U.S. Pat. Nos. 6,651,513, 6,910,366 or U.S. Pat. No. 7,080,564, directly to measure, by means of measuring transducers of vibration-type, viscosity of the medium flowing through such a measuring transducer, for instance, based on an excitation power required for exciting the oscillations. The excitation power can, in turn, be ascertained, for example, on the basis of the exciter, or driver, signal delivered by the driver circuit, or, such as, among others, mentioned in U.S. Pat. No. 6,910,366, on the basis of the operating parameters for the driver circuit controlling the generating of the driver signal. In the case of at least one, at least sectionally straight, measuring tube, viscosity can also be determined based on torsional oscillations of the same.

In the case of measuring transducers with two measuring tubes, these are most often connected into the process line (most often embodied as a rigid pipeline) via a distributor piece extending on the inlet side between the measuring tubes and an inlet-side connecting flange as well as via a distributor piece extending on the outlet side between the measuring tubes and an outlet-side connecting flange. In the case of measuring transducers with a single measuring tube, the latter communicates most often with the process line via an essentially straight, connecting tube piece on the inlet side as well as via an essentially straight connecting tube piece on the outlet side. Additionally, each of the shown measuring transducers with a single measuring tube includes at least one, for example, tube-, box- or plate-shaped, counteroscillator embodied as one piece or a plurality of parts coupled on the inlet side to the measuring tube to form a first coupling zone and coupled on the outlet side to the measuring tube to form a second coupling zone, and, during operation, essentially at rest or oscillating opposite-equally to the measuring tube, thus with equal frequency and opposite phase. The inner part of the measuring transducer formed by means of measuring tube and counteroscillator is most often held, alone, by means of the two connecting tube pieces (via which the measuring tube communicates, during operation, with the process line), in a protective measuring transducer housing, especially in a manner enabling oscillations of the inner part relative to the housing. In the case of the measuring transducers with a single, essentially straight measuring tube illustrated, for example, in U.S. Pat. Nos. 5,291,792, 5,796,010, 5,945,609, 7,077,014, U.S. A 2007/0119264, WO 0,102,816 or also WO 9,940,394, the measuring tube and the counteroscillator are, such as quite usual in the case of conventional measuring transducers, oriented essentially coaxially relative to one another. In the case of usually marketed measuring transducers of the aforementioned type, most often also the counteroscillator is embodied essentially tubularly in the form of an essentially straight, hollow cylinder, which is so arranged in the measuring transducer, that the measuring tube is jacketed at least partially by the counteroscillator. Most often used as materials for such counteroscillator, especially also in the case of application of titanium, tantalum or zirconium for the measuring tube, are comparatively cost effective, steel types, such as, for instance, structural steel or free-machining steel.

The exciter mechanism of measuring transducers of the type being discussed includes usually at least one electrodynamic oscillation exciter and/or an oscillation exciter acting differentially on the at least one measuring tube and the, in given circumstances, present counteroscillator or the, in other given circumstances, present, other measuring tube, while the sensor arrangement includes an inlet-side, most often likewise electrodynamic, oscillation sensor as well as at least one, thereto essentially equally constructed, outlet-side oscillation sensor. Such electrodynamic and/or differential, oscillation exciters of usually marketed measuring transducers of vibration-type are formed by means of a magnet coil, through which electrical current flows, at least at times. In the case of measuring transducers having a measuring tube and a counteroscillator coupled therewith, most often the magnet coil is affixed on the latter. Such electrodynamic and/or differential oscillation exciters additionally include, interacting with the at least one magnet coil, especially plunging into it, serving as armature, a rather elongated, especially rod-shaped, permanent magnet, which is affixed correspondingly to the measuring tube to be moved. The permanent magnet and the magnet coil serving as exciter coil are, in such case, usually so oriented, that they extend essentially coaxially relative to one another. Additionally, in the case of conventional measuring transducers, the exciter mechanism is usually embodied and placed in the measuring transducer in such a manner, that it acts essentially centrally on the at least one measuring tube. In such case, the oscillation exciter and, insofar, the exciter mechanism, such as, for example, also proposed in the case of the measuring transducers disclosed in U.S. Pat. Nos. 5,796, 010, 6,840,109, 7,077,014 or U.S. Pat. No. 7,017,424, is most often affixed outwardly on the measuring tube at least pointwise along an imaginary central peripheral line of the measuring tube. Alternatively to an exciter mechanism formed by means of oscillation exciters acting rather centrally and directly on the measuring tube, it is possible, such as, among other things, provided in U.S. Pat. Nos. 6,557,422, 6,092,429 or U.S. Pat. No. 4,823,614, to use, for example, exciter mechanisms formed by means of two oscillation exciters affixed not at the center of the measuring tube, but, instead on the and outlet sides thereof, or, such as, among other things, provided in U.S. Pat. No. 6,223,605 or U.S. Pat No. 5,531, 126, for example, also by means of an exciter mechanism formed by an oscillation exciter acting between the, in given circumstances, present counteroscillator and the measuring transducer housing.

In the case of most market-ordinary measuring transducers of vibration-type, the oscillation sensors of the sensor arrangement are, such as already indicated, essentially of equal construction to that of the at least one oscillation exciter, at least to the extent that they work according to the same principle of action. Accordingly, also the oscillation sensors of such a sensor arrangement are most often in each case formed by means of: At least one magnet coil—usually affixed to the, in given circumstances, present counteroscillator—, at least at times, passed through by a variable magnetic field, and, associated therewith, containing, at least at times, an induced measurement voltage; as well as, affixed to the measuring tube and interacting with the at least one magnet coil, a rod-shaped permanent magnet, which delivers the magnetic field. Each of the aforementioned coils is additionally connected by means of at least one pair of electrical connecting lines with the mentioned measuring device electronics of the in line measuring device. These lines are, most often, led on shortest possible paths from the coils over the counteroscillator to the transducer housing.

The measuring device electronics (often also referred to as measurement transmitter, or, simply, transmitter) of conventional in line measuring devices of the aforementioned type most often contain a microcomputer, which delivers digital measured values in real time and which is formed, for example, by means of a digital signal processor. This includes, besides at least one corresponding processor and its associated peripheral circuit components, such as e.g. ND converters and D/A converters, most often also corresponding volatile and non-volatile data memories for storing also of digital measuring or operating data internally ascertained and/or externally transmitted to the particular in line measuring device, and required for the safe performance of the bottling process—, in given cases, also for a retentive logging of the same—, data such as, for instance, chemical and/or physical properties of the medium to be measured, relevant for control of the bottling process and/or for the actual measuring. Besides the microcomputer and the driver circuit enabling the operating of the measuring transducer, the measuring device electronics additionally includes usually, for implementing the conditioning of the measurement signals delivered by the measuring transducer to the microcomputer, an input circuit, which is connected together with the microcomputer to form a measuring and evaluating circuit of the measuring device electronics. Based on the measurement signals delivered by the measuring transducer and/or on driver signals delivered from the measuring device electronics for driving the measuring transducer, the microcomputer ascertains, for the control of the bottling process, required primary measured values, such as, for instance, an instantaneous mass flow rate of the medium flowing through the measuring transducer and/or an integrated mass flow rate, which corresponds to a mass of the medium, which, during a predetermined period of time, especially a period of time corresponding with a predetermined amount of filling of the medium, such as, for instance, a filling period extending from an operating point in time corresponding to a starting point in time of an individual filling procedure up to an operating point in time corresponding to an end point in time of the same filling procedure, has totally flowed through the measuring transducer, and makes this available in real time.

Since conventional in line measuring devices of the type being discussed usually are embodied as independent measuring devices, which are to be integrated into a superordinated electronic data processing system controlling, for example, one or a number of filling machines and/or formed by means of programmable logic controllers (PLCs), especially via 2-wire or via 4-wire cable and/or wirelessly via radio, the particular measuring device electronics of a modern in line measuring device of the type being discussed includes most often also a corresponding communication circuit enabling the sending, or receiving, of measuring and/or operating data, for example, a communication circuit in the form of a digital output established in industrial measuring and automation technology, or in the form of an established 4-20-mA electrical current signal output, or in the form of a measurement transmitter interface meeting NAMUR recommendation NE43:1994 and/or PROFIBUS standard IEC 61158 or in the form of an interface circuit conforming to some other industrial standard. Moreover, provided in the measuring device electronics also is a supply circuit assuring the internal supplying of the in line measuring device with electrical energy, for example, drawing the energy from the electronic data processing system via 2-wire or via 4-wire cable and/or drawing the energy from an internal energy storer. Additionally, it is, such as, for example, mentioned in DE A 10 2006 013826, also usual directly to connect in line measuring devices of the type being discussed to the filling process controlling actuators, such as, for instance, valves and/or electric motors, in order to operate these essentially realtime with control commands, which are derived from the ascertained, totaled, mass flow as well as from therefor corresponding, predetermined, desired values.

In the case of the application of flow measuring, in line measuring devices having a measuring transducer of vibration-type, especially Coriolis mass flow measuring devices, in filling processes, it has, however, been found, that the accuracy of measurement, with which the respective primary measured values, especially the mass flow rate or the usually therefrom derived, integrated mass flow, are, in each case, ascertained, at flow conditions lying within predetermined specifications and even in the case of sufficiently known or also media properties held largely constant, such as, for instance, a density and a viscosity of the medium, can be subject to quite considerable fluctuations; this, especially, also, in spite of corresponding taking into consideration, for example, through targeted suppressing and/or corresponding compensating of the—, among others, discussed in the initially mentioned U.S. Pat. Nos. 7,296,484, 7,181,982, 7,040,181, B 7,040,180, 6,910,366, 6,880,410, 6,471,487, 6,505,519, 6,311,136, 7,412,903, B 07/360,453, 7,360,452, US A 2008/0011101, US A 20080190195, WO A 06/127527, WO A 06/104690, WO A 05/093381, WO A 05/003690 or WO A 08/011,587—circumstance, that the medium to be measured can, for process reasons, be formed of two or more phases, for example, as with liquid containing gas and/or solid, and/or, in spite of corresponding correction, in given cases, of known effects associated therewith on the respective measurement signals, such as, for instance, the so-called "bubble effect", or the so-called "moving resonator effect", etc. As a result of this, the accuracy of measurement can—, in spite of significant compensation, or eliminating, of known disturbing influences—lie possibly also far outside of a tolerance range acceptable for such filling or metering applications, even after taking into consideration the aforementioned disturbing influences. Especially, it has been found, first, that these disturbances caused by inhomogeneities in the medium, such as, for instance, gas bubbles and/or solid particles entrained in a liquid, have not only frequency equal to the oscillations of the measuring tube, but also each of the two sensor signals are burdened with an additional phase shift, and, indeed, in a manner changing the phase difference between the two sensor signals and, thus, also the phase difference between, in each case, one of the sensors, or also oscillation measurement signals, and the at least one exciter signal. As a result of this, the mass flow rate, m', ascertained during different measuring cycles can assume, for instance, the curve shown dashed in FIG. 1$a$ and the totaled mass flow, M', ascertained during the same measuring cycles, for example, by integrating the mass flow rates measured one after the other, for instance, as shown by the likewise dashed curve in FIG. 1$b$. In comparison therewith, FIGS. 1$a$, 1$b$ show the curves as a function of time for the actually set mass flow rate, m, and the actually flowed, totaled mass flow, M.

In additional tests, first, the recognized disturbing influence of the aforementioned inhomogeneities on the accuracy of measurement of the affected in line measuring devices was largely eliminated with the help of measures known from the state of the art, for example, by reducing the possibility of gas inclusions in the medium and/or by supplying the medium in the measuring transducer with a comparatively high pressure. Although, in such case, additionally, also, the stationary asymmetries in the flow profile, as discussed in the initially mentioned U.S. Pat. No. 6,513,393, brought about, for example, by pronounced curvatures of the measuring tubes and/or by turbulence in the flowing medium could largely be excluded, still, from time to time, after as before, considerable deviation of the so ascertained, primary measured values of the actual measured variables could be observed—this, especially, in the case of viscous, or thick, liquid, structurally viscous, thixotropic or pasty media, such as, for instance, syrup, honey, mayonnaise, yoghurt, tomato paste, mustard, liquid detergents, glycerin or the like.

Further investigations under laboratory conditions using in line measuring devices of the type being discussed have, first of all, shown, that also for the case, in which the fraction of inhomogeneities in the medium relative to the, for the measuring, effective total volume of the at least one measuring tube is kept very small and constant, in spite of application of the corrective measures established for such filling processes, or for multiphase media, considerable inaccuracies in the primary measured variables, such as, for instance, primary measured values representing mass flow rate or totaled mass flow, can occur. Surprisingly, it has been found, in such case, even, that the measuring errors in the case of low concentration of inhomogeneities and/or in the case of low flow velocity can, at times, be larger, than in the case of a comparatively higher concentration, or in the case of higher flow velocities. Furthermore, it could be detected, that the measuring errors, counter to established operational experience, also in the case of an essentially perpendicularly installed measuring transducer with longitudinal axis extending in the direction of gravitation can, at times, be larger, than in the case of a horizontally installed measuring transducer. Additionally, in experiments with stepwise changed flow velocity of the medium and stepwise varied duratione of the measuring cycles, it was observed, that, especially also in the case of totaled mass flow conventionally derived from the mass flow rate, considerable deviations from the actually flowed through mass-flow can, at times, occur in, first of all, non-reproducible manner,—this, especially, also in the case of mass flow rate held largely constant and largely uniformly low impurities loading of the medium—here, air bubbles in water (FIG. 1b).

Accordingly, it is to be assumed therefrom, that even only sometimes occurring inhomogeneities in the medium can also so directly affect the phase difference essential for the mass flow measurement, that the zero-point of the in line measuring device can, during operation, vary sporadically in considerable measure and in a manner not correctable with conventional corrective measures. As a result of this, conventional in line measuring devices of the type being discussed can, at times, exhibit a considerably lessened accuracy of measurement, or a lessened reproducibility, of the primary measured values, especially also in the case of the totaled mass flow eminently important for the control of filling processes. As a result of this, in the case of conventional in line measuring devices, in the case of an, for these, unfavorable loading of the medium with impurities and/or in the case of an unfavorable clocking of therewith controlled filling processes, a possible over—, or, such as in FIG. 1b, a corresponding underfilling, cannot always be excluded with certainty.

SUMMARY OF THE INVENTION

An object of the invention is, therefore, to improve in line measuring devices for flowing media having a measuring transducer of vibration-type toward the goal of largely suppressing or at least clearly minimizing the damaging influence of inhomogeneities of the aforementioned type on the accuracy of measurement of such in line measuring devices, especially with respect to their zero-points, especially in the case of inhomogeneities arising sometimes in a medium to be measured and/or during a filling procedure serving for metering a predetermined charge of a medium. Additionally, it is an object of the invention to improve in line measuring devices of the type being discussed toward the goal that an exact, especially also robust and sufficiently well reproducible, measuring of the measured variables to be ascertained for a filling, especially the mass flow rates and/or totaled mass flows, is enabled also in the case of two- or multiphase media, or in the case of batch operation, and, therewith, an exact metering can be assured.

For achieving the object, the invention resides in an in line measuring device, for instance, a Coriolis mass flow/density measuring device and/or a Coriolis mass flow/viscosity measuring device, for an, at least at times, two- or multiphase, flowable medium and/or a flowable medium containing impurities, such as, for instance, gas bubbles and/or solid particles. The in line measuring device comprises a measuring transducer of vibration-type having: at least one measuring tube vibrating, at least at times, during operation, especially a measuring tube performing bending oscillations, and conveying, at least at times, a two- or multiphase flowable medium and/or a flowable medium carrying impurities; an exciter mechanism acting, for example, centrally, on the measuring tube for producing vibrations, especially bending oscillations, of the at least one measuring tube; and a sensor arrangement for registering vibrations, especially bending oscillations, of the at least one measuring tube and for delivering at least one oscillation measurement signal representing oscillations, especially bending oscillations, of the measuring tube. Moreover, the in line measuring device comprises, electrically coupled with the measuring transducer, a measuring device electronics, which delivers, at least at times, at least one exciter signal driving the exciter mechanism, for example, an exciter signal having a periodically variable and/or impressed, electrical current, and which, at least at times,—for example, by means of the at least one oscillation measurement signal and/or by means of the at least one exciter signal—during operation, especially periodically and/or, with a predetermined updating rate, recurringly ascertains a damping value of first type, which represents a change within a predeterminable time interval of damping opposing the vibrations of the measuring tube, especially corresponding to a change of a spatial distribution of inhomogeneities, such as, for instance, gas bubbles and/or solid particles, in the medium flowing through the at least one measuring tube and/or to a change of the concentration of inhomogeneities, such as, for instance, gas bubbles and/or solid particles, in the medium flowing through the at least one measuring tube, for example, thus an absolute or a relative increase of the damping in the form of a difference between a damping measured at an end point in time of the time interval and a damping measured at a starting point in time of the time interval; equally, the change of damping represented by means of the damping value of first type can, at times, also be an absolute or a relative decrease of the aforementioned damping.

In a first embodiment of the invention, it is provided, that the measuring device electronics ascertains the damping value of first type based on a derivative with respect to time of a damping of vibrations of the at least one measuring tube symmetric with reference to an imaginary central plane of the at least one measuring tube coplanar with a cross section of the measuring tube and/or with reference to an imaginary line of action of an exciter force exerted, during operation, of the exciter mechanism on the measuring tube under the influence the exciter signal. Especially suitable for calculating the damping value of first type are, in such case, those dampings that oppose bending oscillations of the at least one measuring tube in a wanted mode of the measuring transducer excited by means of the exciter mechanism, since these can be practically directly measured by means of the measuring device electronics on the basis of the measuring, or driver, signals, such as, for instance, the oscillation measurement signals and the exciter current, typically present in the case of measuring transducers of the type being discussed. The excited oscillations in the wanted mode can be—such as quite usual in the case of measuring transducers of the type being discussed—bending oscillations about an imaginary bending oscillation axis of the measuring transducer imaginarily connecting in- and outlet ends of the measuring transducer.

In a second embodiment of the invention, it is provided, that the measuring device electronics ascertains the damping value of first type taking into consideration a flow velocity of the medium, such as, for instance, an instantaneous flow velocity and/or a flow velocity averaged over time.

In a third embodiment of the invention, it is provided, that the measuring device electronics internally stores, during operation, at least at times, at least one density measured value, for example, a density measured value ascertained by means of the at least one oscillation measurement signal and/or by means of the exciter signal, at least at times, especially periodically recurringly, which represents a density, $\rho$, of the medium conveyed within the at least one measuring tube.

In a fourth embodiment of the invention, it is provided, that the measuring device electronics ascertains, during operation, recurringly, especially periodically, by means of the at least one oscillation measurement signal, an oscillation measured value, which represents an oscillation amplitude of oscillations, especially bending oscillations, of the at least one, vibrating measuring tube and/or an effective value of thereof.

In a fifth embodiment of the invention, it is provided, that the at least one measuring tube, during operation,—driven by the exciter mechanism driven by means of the at least one exciter signal—is excited, at least at times, to vibrate in a wanted mode of the measuring transducer, in which it executes, at least partially, especially predominantly and/or symmetrically with reference to an imaginary central plane of the at least one measuring tube coplanar with a cross section of the measuring tube, bending oscillations about an imaginary bending oscillation axis of the measuring transducer, which extends essentially parallel to, or coincides with, an imaginary longitudinal axis of the measuring transducer imaginarily connecting an inlet end of the measuring tube with an outlet end of the measuring tube. Developing this embodiment of the invention further, it is additionally provided, that the exciter mechanism additionally causes the at least one measuring tube, during operation, to execute, at least at times, bending oscillations around the imaginary bending oscillation axis, especially predominantly at a lowest resonance frequency of the measuring tube, which are essentially symmetric with respect to the imaginary central plane of the at least one measuring tube. Alternatively thereto or in supplementation thereof, the at least one measuring tube vibrating in the wanted mode oscillates under the influence of Coriolis forces induced in the through flowing medium, at least at times, in a Coriolis mode of the measuring transducer superimposed on the wanted mode, in which it at least partially, especially predominantly, with reference to an imaginary central plane of the at least one measuring tube coplanar with a cross section of the measuring tube, executes antisymmetric bending oscillations about the imaginary bending oscillation axis of the measuring transducer. For the aforementioned case, the damping value of first type represents a damping, which opposes the bending oscillations of the at least one measuring tube corresponding to the Coriolis mode.

In a sixth embodiment of the invention, it is provided, that the measuring device electronics, during operation, especially periodically recurringly, by means of the at least one oscillation measurement signal and/or by means of the exciter signal, ascertains an excitation measured value, which represents an exciter force, especially an amplitude and/or an effective value of thereof, maintaining oscillations, especially bending oscillations, of the at least one measuring tube, and/or which represents an excitation power maintaining oscillations, especially bending oscillations, of the at least one measuring tube.

In a seventh embodiment of the invention, it is provided, that the measuring device electronics during operation, especially periodically and/or, with a predetermined updating rate, recurringly, especially by means of the at least one oscillation measurement signal and/or by means of the exciter signal, ascertains, especially also internally stores, a damping value of second type, which represents, instantaneously, a symmetric damping of vibrations of the at least one measuring tube, especially of bending oscillations of the at least one measuring tube about an imaginary bending oscillation axis of the measuring transducer and/or in a wanted mode of the measuring transducer excited by means of the exciter mechanism, especially symmetric damping variable in time and/or with reference to an imaginary central plane of the at least one measuring tube coplanar with a cross section of the measuring tube and/or with reference to an imaginary line of action of an exciter force exerted, during operation, of the exciter mechanism under the influence the exciter signal on the measuring tube. Developing this embodiment of the invention further, it is additionally provided for the above-described case, in which the measuring device electronics, during operation, recurringly ascertains an excitation measured value as well as also an oscillation measured value, that the measuring device electronics calculates the damping value of second type based on a, during operation, recurringly, especially periodically, ascertained ratio of the excitation measured value to the oscillation measured value. Alternatively thereto or in supplementation thereof, the measuring device electronics calculates the damping value of first type based on at least one damping value, especially two or a plurality of damping values of second type ascertained during various measuring cycles, for example based on a difference of two damping values of second type generated during different measuring cycles. Developing this embodiment of the invention further, the measuring device electronics ascertains the damping value of first type based on a difference quotient representing the time derivative of the symmetric damping, for example, formed of a ratio of the aforementioned difference to the time interval lying between the two damping values.

For ascertaining the damping value of first type, the measuring device electronics holds additionally a measuring device parameter, especially an internally stored and/or internally ascertained, measuring device parameter, which moderates between the damping value of second type and the damping value of first type. This measuring device parameter is a characteristic value of the in line measuring device dependent on the actual construction of the measuring transducer and/or on the medium, which is ascertained, for example, in the course of a wet calibration of the in line measuring device—thus by supplying the measuring transducer with a known medium of known, or impressed, mass flow rate and/or in dialog with a user interacting with the in line measuring device—, for instance, during start-up of the in line measuring device and/or recurringly during operation.

In an eighth embodiment of the invention, it is provided, that the measuring device electronics generates by means of the at least one oscillation measurement signal and/or by means of the exciter signal, especially also by means of the damping value of first type, at least at times, especially periodically and/or, with a predetermined updating rate, recurringly, at least one mass flow measured value, which represents, instantaneously, a mass flow rate, m, of the medium conveyed in the at least one measuring tube. Developing this embodiment of the invention further, it is additionally provided, that the measuring device electronics, by means of the at least one damping value of first type, generates, in given cases, an alarm, which signals, that the mass flow measured value has a lessened accuracy of measurement, especially as a result of a quality of the medium differing from a corresponding specification. Alternatively thereto or in supplementation thereof, it is additionally provided, that the measuring device electronics generates by means of the at least one oscillation measurement signal and/or by means of the exciter signal, at least at times, especially periodically and/or, with a predetermined updating rate, recurringly, a provisional mass flow measured value, which represents the mass flow rate, m, of the medium conveyed in the at least one measuring tube less accurately than the mass flow measured value. Under application of the provisional mass flow measured value as well as the damping value of first type, by means of the measuring device electronics, the mass flow measured value can be generated with very high accuracy of measurement also in the case of asymmetric damping of vibrations of the at least one measuring tube as a result of inhomogeneities in the medium.

In a ninth embodiment of the invention, it is provided, that the measuring device electronics generates, by means of the at least one oscillation measurement signal and/or by means of the exciter signal, as well as by means of the damping value of first type, at least at times, especially periodically and/or, with a predetermined updating rate, recurringly, a mass measured value, which represents, instantaneously, a totaled mass flow, which corresponds to a mass of the medium to be measured, which totally flows through the measuring transducer during a time interval. Developing this embodiment of the invention further, it is additionally provided, that the measuring device electronics generates by means of the at least one damping value of first type, in given cases, an alarm, which signals, that the mass measured value has a lessened accuracy of measurement, especially as a result of a quality of the medium differing from a corresponding specification. Alternatively thereto or in supplementation thereof, the damping value of first type is calculated in such a manner, that the damping represented thereby corresponds to an antisymmetric damping of the vibrations of the at least one measuring tube totaled over the time interval. The time interval can be fixedly predetermined or recurringly ascertained during operation, or also be newly defined by a user interacting with the in line measuring device and/or by a superordinated electronic data processing system controlling the in line measuring device. In the case of use of the in line measuring device in a filling process, the time interval can, for example, correspond to a filling period operating point in time corresponding to an a starting point in time of a filling procedure up to an operating point in time corresponding to an end point in time of the same filling procedure, especially to a filling period corresponding to a predetermined amount of filling of the medium.

In a tenth embodiment of the invention, it is provided, that the measuring device electronics generates by means of the at least one oscillation measurement signal and/or by means of the exciter signal, as well as by means of the damping value of first type, at least at times, especially periodically and/or, with a predetermined updating rate, recurringly, a mass measured value, which represents, instantaneously, a totaled mass flow, which corresponds to a mass of the medium to be measured, which totally flows through the measuring transducer during a time interval, wherein the measuring device electronics generates by means of the at least one oscillation measurement signal and/or by means of the exciter signal, at least at times, especially periodically and/or, with a predetermined updating rate recurringly, at least one provisional mass measured value, which represents the mass to be measured less accurately than the actual mass measured value. Developing this embodiment of the invention further, it is additionally provided, that the measuring device electronics generates the at least one mass measured value also by means of the provisional mass measured value and/or by means of the damping value of first type. For the mentioned case, in which the measuring device electronics, during operation, additionally also ascertains, recurringly, a mass flow of the measuring device, the current mass measured value can, in each case, also be ascertained by means of a previously ascertained mass measured value as well as by means of a current, provisional, mass flow measured value.

In an eleventh embodiment of the invention, it is provided, that the measuring device electronics internally stores, during operation, at least at times, at least one velocity measured value, for example, also ascertained by means of the at least one oscillation measurement signal and/or by means of the exciter signal, which represents, instantaneously, a flow velocity of the conveyed medium within the at least one measuring tube. Developing this embodiment of the invention further, it is additionally provided, that the measuring device electronics ascertains the damping value of first type also with application of the velocity measured value. For the aforementioned case, in which the measuring device electronics ascertains, at least at times, a density measured value representing a density of the medium conveyed within the at least one measuring tube, the measuring device electronics can, during operation, generate the at least one velocity measured value also by means of said density measured value, for example, by means of numerical division of a mass flow measured value generated, in given cases, likewise by means of the measuring device electronics, by the density measured value and/of by means of numerical division of a mass measured value generated, in given cases, likewise by means of the measuring device electronics, by the density measured value. Developing this embodiment of the invention further, it is additionally provided, that the measuring device electronics provides a measuring-device-specific, measuring device parameter, especially a measuring-device-specific, measuring device parameter corresponding to an effective flow cross section of the measuring transducer, which moderates between a velocity measured value ascertained in the case of supplying the measuring transducer with a flowing medium of predetermined flow velocity and the flow velocity specified for this. The measuring device parameter can be ascertained earlier, experimentally very simply, for example, in the course of a calibration of the in line measuring device with flowing medium of predetermined flow velocity. Especially for the case, in which the in line measuring device is so installed, that the longitudinal axis of the measuring transducer is essentially vertical, and/or for the case, in which the medium typically carries an impurity, whose density and/or whose viscosity deviate(s) in considerable measure from that of the actual medium, according to another further development of the thirteenth embodiment of the invention, it is additionally provided, that the measuring device electronics provides, or uses, internally, for ascertaining the flow velocity, or for ascertaining the damping measured value of first type, a parameter of the medium which represents an—in the case of given installed situation at least, on average, largely invariant over time—relative velocity between the current medium and the therein possibly contained impurity. Such a relative movement between impurity and medium and, associated therewith, the relative velocity can, for example, be brought about as a result of an accelerating force acting on the impurity, such as, for instance, the force of gravity, or a buoyant force.

In a twelfth embodiment of the invention, it is provided, that the exciter mechanism includes an oscillation exciter, especially a single and/or electrodynamic, oscillation exciter, acting essentially centrally on the at least one measuring tube.

In a thirteenth embodiment of the invention, it is provided, that the measuring device electronics generates, by means of the at least one damping value of first type, an alarm, which signals, that the medium has a quality deviating from a corresponding specification, especially a maximum allowable fraction of entrained impurities.

In a fourteenth embodiment of the invention, it is provided, that the measuring device electronics generates, by means of the at least one damping value of first type, an alarm, which signals, that the in line measuring device is operating outside of a specification predetermined therefor.

In a fifteenth embodiment of the invention, it is provided, that the measuring device electronics recurringly generates the damping value of first type with a predetermined updating rate, especially an updating rate, which is essentially constant during a period of time extending over a number of measuring cycles.

In a sixteenth embodiment of the invention, it is provided, that the damping value of first type represents a damping, which is induced by medium conveyed in the at least one measuring tube and which opposes vibrations of the at least one measuring tube, which are antisymmetric with respect to an imaginary central plane of the at least one measuring tube coplanar with a cross section of the measuring tube.

In a seventeenth embodiment of the invention, it is provided, that the damping value of first type represents a change of a damping with respect to time, which is induced by medium conveyed in the at least one measuring tube and opposes damping of vibrations of the at least one measuring tube, which are symmetric with respect to an imaginary central plane of the at least one measuring tube coplanar with a cross section the measuring tube.

The in line measuring device of the invention is, especially, suitable also for the use in a filling process, for example, also for control of a filling procedure serving for metering, or dosing, a predetermined amount and/or mass, $M_{DESIRED}$, of a medium into a containment, especially a bottle, a cup, a can, a glass, an ampoule or the like, and/or for ascertaining a filling period required for metering a predetermined amount and/or mass, $M_{DESIRED}$, of a medium, extending from a starting point in time of a corresponding filling procedure up to an end point in time of the same filling procedure and/or for ascertaining an end point in time, $t_n$, of a filling procedure serving for metering a predetermined amount and/or mass, $M_{DESIRED}$, of a medium. Other advantageous applications as well as also embodiments of the in line measuring device of the invention will become evident on the basis of subsequent explanations, the examples of embodiments, as well as the claims.

The invention is based on the surprising discovery that, besides the known effects of inhomogeneities of the type being discussed, for example, also of undesired, or unavoidable, impurities formed in the medium, such as, for instance, the mentioned "bubble effect" or the "moving resonator effect", in considerable measure, also an instantaneous spatial distribution of such inhomogeneities, such as, for instance, gas bubbles and/or solid particles, arising, in given cases, also only sporadically and/or, now and then, within the medium flowing in the measuring tube, can influence the oscillation measurement signals of measuring transducers of vibration-type. Identified as meaningful for influencing the measurement signals, especially also their phase position relative to one another, or relative to the exciter signal, and, thus, also the zero-point of the in line measuring device as a whole was, in such case, an asymmetry, variable, at times, in considerable measure and/or in an unpredictable manner, of a spatial distribution of such inhomogeneities within the measuring tube with respect to the above mentioned symmetry plane of the respective measuring tube referred to as the central plane. Accompanying such a, variable in time, most often also only temporarily arising, asymmetry of the spatial distribution of the inhomogeneities in the medium, such as it can be frequently observed, for example, in the case of filling processes with short filling period and/or with charge volume small in comparison to the measuring tube volume, in the case of applications of smaller flow velocity and/or in the case of perpendicularly installed measuring transducer, there acts on the vibrating measuring tube as a whole also an equally variable asymmetric damping, D, which leads to the fact that both the oscillation form excited in the wanted mode as well as also that in the Coriolis mode are correspondingly deformed and the oscillation sensors register, supplementally to the actual measurement effects, an oscillatory movement influenced by the asymmetric damping, or a corresponding asymmetric damping force contribution.

As a result of such an asymmetry brought about, for example, by an individual air bubble entrained in a liquid and slowly flowing through the measuring tube, curves for the measured mass flow rate, m', or the therefrom derived, totaled mass flow, M', as functions of time, can, as illustrated in FIGS. 1a, 1b, arise, which in each case partially significantly differ from the actual measured variables. FIG. 1a shows between the points in time, $t_{in}$, $t_{out}$, measured mass flow rate as a function of time in the form of a wave in the curve caused by an air bubble entrained in uniformly flowing medium flowing essentially slip free—thus without mentionable relative velocity between the medium and impurity—from the entry of such at the inlet end of the measuring tube up to reemergence at the outlet end of the measuring tube. The point of inflection of the wave corresponds, in such case, to the measured mass flow rate at the point in time, at which the air bubble passed the mentioned imaginary central plane. On the basis thereof, it is directly recognizable that a, with respect to the central plane—at least in an imaginary projection onto the longitudinal axis—essentially symmetrically embodied spatial distribution of inhomogeneities of the type being discussed, or the complete traversing of the measuring tube on the part of such an inhomogeneity within a considered time interval, $\Delta T_M = t_2 - t_1$, such as, for instance, a filling period relevant for a corresponding calibration, leads to practically no degrading of the zero-point going beyond known effects. For the other case, however, that as a result of asymmetric spatial distributions of inhomogeneities in the measuring tube with respect to the mentioned central plane, asymmetric dampings, D, effectively oppose the oscillations of the measuring tube, is to be assumed therefrom, that the measured values ascertained based on the oscillations of the measuring tube, especially based on its oscillation forms influenced by the medium flowing through, such as, for instance, the mass flow rate and/or the totaled mass flow, can, without corresponding compensation measures, be burdened in considerable measure with error. As a result of such, variable in time asymmetries in the spatial distribution of the inhomogeneities, or in the damping degrading measuring tube oscillations, it is accordingly thus required to condition, suitably, measurement signals delivered by conventional measuring transducers of vibration-type, or the measured values ascertained from conventional in line measuring devices, through further corrective measures correspondingly also taking into consideration the asymmetric damping.

Moreover, it has additionally been discovered, that the dependencies of the zero-point, or its sporadic changes during operation, are, especially, to be attributed to that modal part of these asymmetric dampings, which effectively oppose the antisymmetric oscillations of the measuring tube in the Coriolis mode, and which, consequently, are referred to below also as Coriolis damping or damping of first type, $D_I$. A possible instantaneous form of this damping, $D_I$, of first type along the deflected measuring tube is shown, by way of example and schematically, in FIG. 2, together with a corresponding instantaneous amplitude curve, $S_{II}$, of the oscillations of the symmetric, wanted mode, as well as with a corresponding instantaneous amplitude curve, $S_I$, of the oscillations of the antisymmetric Coriolis mode; the asymmetric damping opposing as a whole the oscillations of the measuring tube corresponds, in such case, essentially to a superpositioning of the wanted mode damping, $D_{II}$, with the Coriolis mode damping, $D_I$.

An opportunity recurringly to measure, or correspondingly to update, during operation, of the in line measuring device, this antisymmetric damping caused by inhomogeneities—and, insofar, rather transitory—is, surprisingly, to ascertain a time derivative of that modal part of the asymmetric dampings, which oppose the—here, symmetric—oscillations of the measuring tube in the wanted mode and which, consequently, are referred to below also as wanted mode damping or damping, $D_{II}$, of second type.

The damping, $D_{II}$, of second type—of which a possible instantaneous form corresponding with the aforementioned antisymmetric damping, $D_I$, of first type is likewise presented in FIG. 2—can be ascertained e.g. based on the exciter signal and one of the oscillation measurement signals and/or based on an excitation power maintaining the oscillations and/or based on the, during operation, recurringly ascertained oscillation quality factor of the measuring tube oscillating in the wanted mode, in conventional manner known to those skilled in the art, for example, also according to the initially mentioned U.S. Pat. No. 5,027,662. A curve with respect to time of the symmetric damping, $D_{II}$, of second type opposing the, here, symmetric wanted mode oscillations, corresponding to the measured values of FIG. 1a, or 1b, is shown for purposes of illustration in FIG. 3b.

The derivative with respect to time of the damping, $D_{II}$, of second type can be sufficiently exactly calculated in the measuring device electronics, during operation, of the in line measuring device, for example, based on a difference quotient formed by means of a damping, $D_{II,i}$, of second type for the current measurement point in time, $t_2=t_i$, and a damping, $D_{II}$, of second kind for a preceding measurement point in time, $t_1=t_{i-1}$, and a time passed between the two measurement points in time. The measured mass flow rate can, thus, in simple manner, be made precise by subsequent correction of a mass flow rate, m', ascertained in conventional manner—thus ascertained first without taking into consideration asymmetries of the aforementioned type, and, as a result, too inaccurately ascertained. Thus, the actual measured variable, m, is more exactly approximated in this manner, for example, through corresponding performance of the operation $$m' - K \cdot \frac{dD_{II}}{dt} \to m$$

in the measuring device electronics.

Alternatively to, or in supplementation of, ascertaining on the basis of the time derivative, $dD_{II}/dt$ of the damping, $D_{II}$, of second type, another opportunity for ascertaining the damping, $D_I$, of first type opposing the, here, antisymmetric Coriolis mode oscillations is to totalize, and thus, correspondingly, to balance the measured symmetric damping, $D_{II}$, of second type over a certain time interval, $\Delta T_M = t_2 - t_1$, for example, predetermined for ascertaining the totaled mass flow, as well as, upon reaching its end, $t_2 = t_n$, correspondingly to include into the balance the individually measured and over the same time interval, $\Delta T_M$, first without taking into consideration the influence of asymmetric dampings, integrated mass flow rates, m'. This balancing of the effectively active fractions of the damping, $D_{II}$, of second type required for ascertaining the damping, $D_I$, of first type can occur, in such case, in simple manner by forming a difference, $\Delta D_{II}$, between an instantaneous damping, $D_{II,2}$, of second type corresponding with the end, $t_{START}$, of the time interval, $\Delta T_M$, and an instantaneous damping, $D_{II,1}$, of second type corresponding with the beginning, $t_1 = t_{START}$, of the same time interval, $\Delta T_M$. A curve with respect to time of the therefrom resulting, ascertained damping, $D_I$, of first type corresponding to the measured values, m', M', of FIG. 1a, or 1b, is shown, for purposes of illustration, in FIG. 3a. The totaled mass flow can be ascertained correspondingly more precisely, in simple manner, by subsequent correction of a mass flow, M', totaled in conventional manner, thus, first, again without taking into consideration asymmetries of the aforementioned type, and, thus, too inaccurately ascertained, for example, by corresponding performance of the operation $$\int_{t1}^{t2} m\, dt = \int_{t1}^{t2} m'\, dt - K_1 \cdot D_{II}(t)$$
$$= \int_{t1}^{t2} m'\, dt - K_1 \cdot \Delta D_{II}$$
$$= M' - K_1 \cdot \Delta D_{II} \to M$$

in the measuring device electronics.

Since the spatial distribution of the inhomogeneities, or its change with respect to time, corresponds with the passage of impurities in the medium through the at least one measuring tube and, insofar, in turn, also with a flow velocity of the medium, the accuracy with which the damping, $D_I$, of first type is ascertained, during operation, can be further improved by taking into consideration an instantaneous impurities loading of the medium conveyed in the measuring tube, or also a flow velocity of the medium. Especially in the case of filling processes of the aforementioned type, as a result of the holding of process conditions largely constant, in such case, usually over a large period of time, both a degree of impurities loading as well as also a set flow velocity can be ascertained very simply with an accuracy sufficient for ascertaining the damping and correspondingly taken into consideration, for example, in the course of a wet calibration of the in line measuring device on-site.

An advantage of the invention is, among other things, that the correction of the measuring errors caused by asymmetries in the spatial distribution of inhomogeneities possibly entrained in the medium to be measured, or by the asymmetric dampings of the measuring tube oscillations associated therewith, can be implemented already by small changes in established evaluating algorithms, or the corresponding program code, for the microcomputer, for evaluating the measurement signals of the measuring transducer and, based thereon, for ascertaining the relevant primary measured values, especially the mass flow measured value or the mass measured value, especially also without mentionable changes in the circuit construction of the measuring device electronics or also without necessarily requiring, especially also in contrast, for instance with the initially mentioned U.S. Pat. No. 6,705,172 or U.S. Pat. No. 7,073,396, and in comparison to established measuring transducer types, any particular change with respect to the mechanical and/or the electromechanical construction of the measuring transducers.

BRIEF DESCRIPTION OF THE DRAWINGS

The invention, as well as other advantageous embodiments thereof, will now be explained in greater detail on the basis of examples of embodiments presented in the additional figures of the drawing. Equal parts are provided in all figures with equal reference characters; in order not to clutter the figures, already mentioned reference characters are omitted in subsequent figures. In particular, the figures show as follows:

FIGS. 1a, and 1b are curves with respect to time of measured mass flow rate, m', or the therefrom derived, totaled mass flow, M', as well as corresponding curves of the actual measured variables, $m_{DESIRED}$, $M_{DESIRED}$ predetermined therefor;

FIGS. 3a, and 3b show corresponding to the curves of FIGS. 1a, 1b, curves with respect to time of a measured symmetric damping, $D_{II}$, and an antisymmetric damping, $D_I$, derived therefrom;

DETAILED DESCRIPTION IN CONJUNCTION WITH THE DRAWINGS

Figure 2:
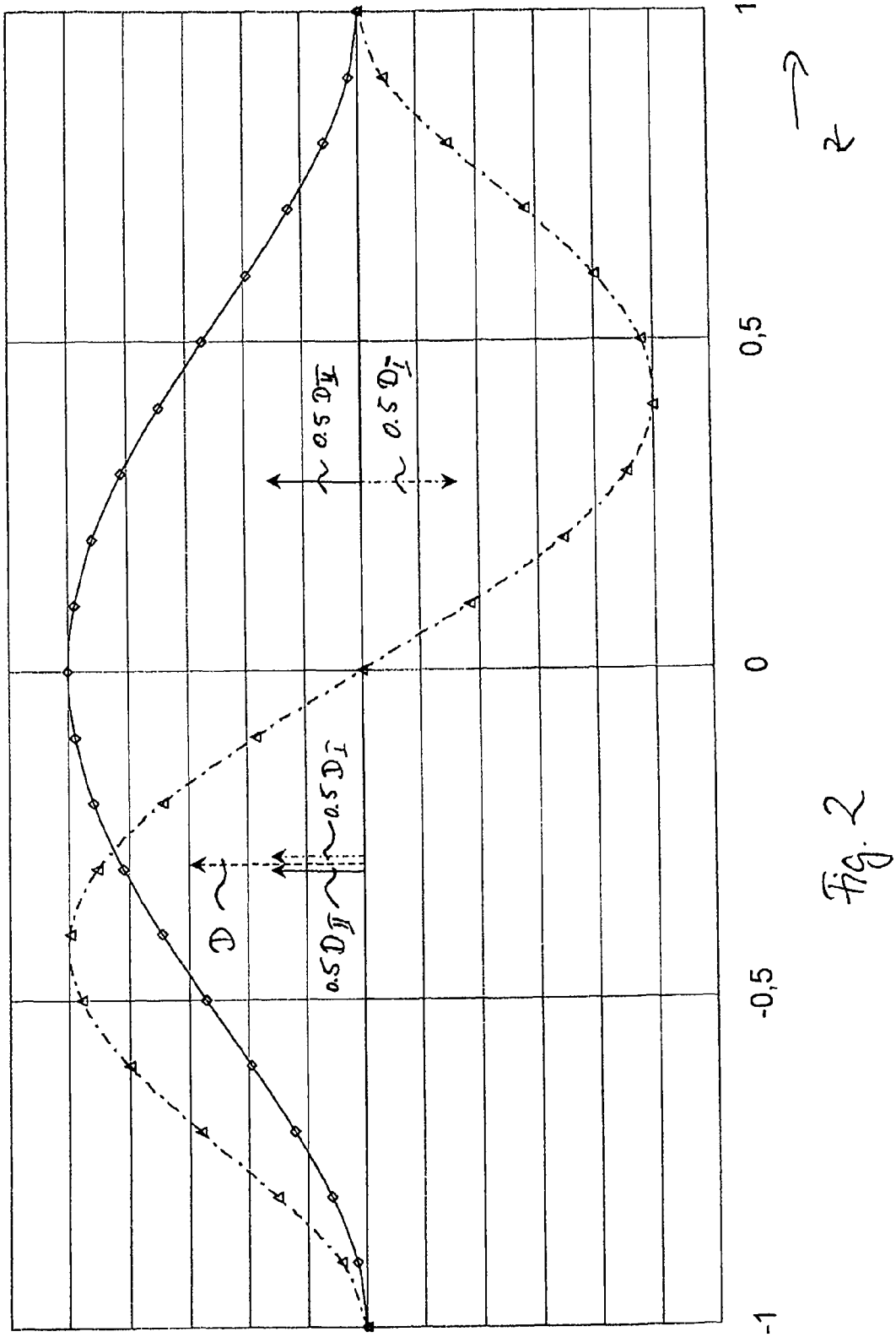
FIG. 2 shows amplitude curves of bending oscillations corresponding to a symmetric oscillatory mode and an antisymmetric oscillatory mode as well as instantaneous characteristics of the damping forces opposing, in each case, the bending oscillations.
Figure 4:
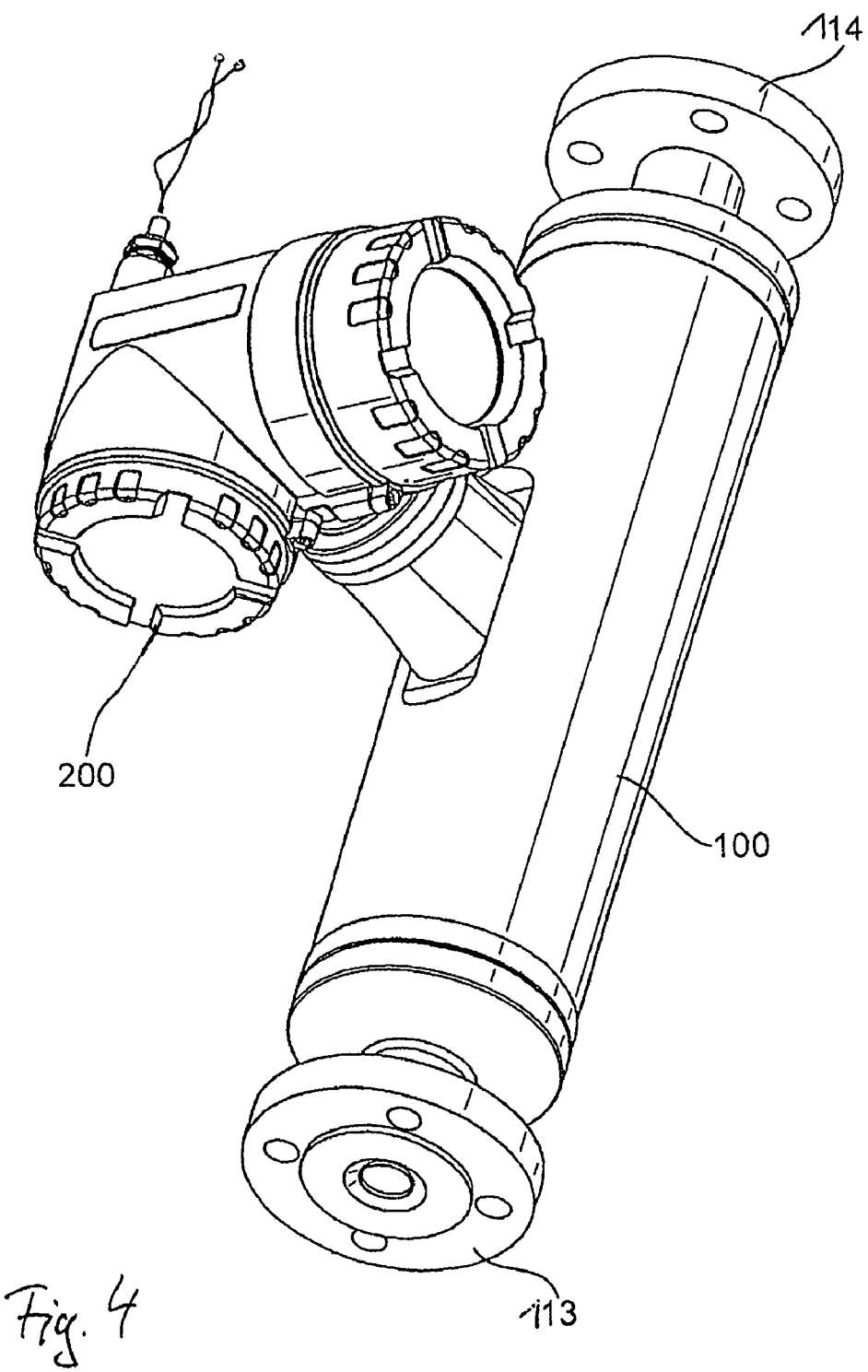
FIG. 4 is an in line measuring device insertable into a pipeline for process line conveyed media.

FIG. 4 shows an in line measuring device, for example, in the form of a Coriolis mass flow measuring device, Coriolis mass flow/density measuring device and/or Coriolis mass flow/viscosity measuring device, insertable into a process line (not shown), for instance, a pipeline of an industrial plant. The in line measuring device serves for measuring and/or monitoring at least one physical, measured variable, for example, a mass flow rate, m, or a totaled mass flow, M, a density, $\rho$, and/or a viscosity, $\eta$, of a medium flowing in the process line, especially a medium, which is, at least at times, a two- or multiphase medium and/or a medium carrying impurities. The in line measuring device, especially a multivariate in line measuring device, is additionally also suitable for application in an automated filling process, especially for control of a filling procedure serving for metering a predetermined amount and/or mass, $M_{DESIRED}$, of a medium into a containment, such as, for instance, a bottle, a glass, a can, a cup, an ampoule or the like, and/or for ascertaining a filling period, $\Delta T_M$, required for metering a predetermined amount of a medium, extending from a starting point in time, $t_1 = t_{START}$, of a corresponding filling procedure up to an end point in time, $t_2 = t_{STOP}$, of the same filling procedure.

The in line measuring device includes therefor a measuring transducer 10 of vibration-type connected via an inlet end as well as an outlet end, in each case, to the process line. During operation, medium to be measured, such as, for instance, a low viscosity liquid or a high viscosity paste or the like, flows through the measuring transducer. Moreover, the measuring transducer is electrically coupled to a measuring device electronics 20 of the in line measuring device. The measuring device electronics serves for activating the measuring transducer, as well as processing primary signals of the measuring transducer 10, and delivers, during operation, measured values representing the at least one measured variable. Preferably, the measuring device electronics is fed externally with electrical energy. Measuring device electronics 20 is accommodated in a corresponding electronics housing 200, especially an impact- and/or also explosion-resistant electronics housing 200, which, in given cases, is also arranged removed from the measuring transducer, and includes a driver circuit serving for activating the measuring transducer, as well as a measuring and evaluating circuit, especially a measuring and evaluating circuit formed by means of a microcomputer, for generating, especially digital, measured values [$X_m$, $X_M$, $X_\rho$, $X_\eta$, . . . ] of the measured variables to be registered by means of the in line measuring device. Additionally, the measuring device electronics contains other electronic components aiding the operation of the in line measuring device, such as, for instance, an internal energy supply circuit NRG, a display and service unit HMI, etc.

In advantageous manner, the measuring device electronics 20, especially a programmable and/or remotely parameterable, measuring device electronics 20, is additionally so designed, that it can, during operation of the in line measuring device, exchange measuring and/or other operating data, such as, for instance, current measured values or tuning and/or diagnostic values serving for the control of the inline measuring device, with an electronic data processing system superordinated thereto, for example, a programmable logic controller (PLC), a personal computer and/or a work station, via a data transmission system, for example, a fieldbus system and/or wirelessly per radio. In such case, the measuring device electronics 20 can, for example, be formed by means of such an internal energy supply circuit NRG, which, during operation, is fed over the aforementioned fieldbus system from an external energy supply provided in the data processing system. For the case, in which the in line measuring device is provided for coupling to a fieldbus or other communication system, the measuring device electronics 20 includes a corresponding communication interface COM for data communication, e.g. according to one of the initially mentioned industry standards.

Figure 5:
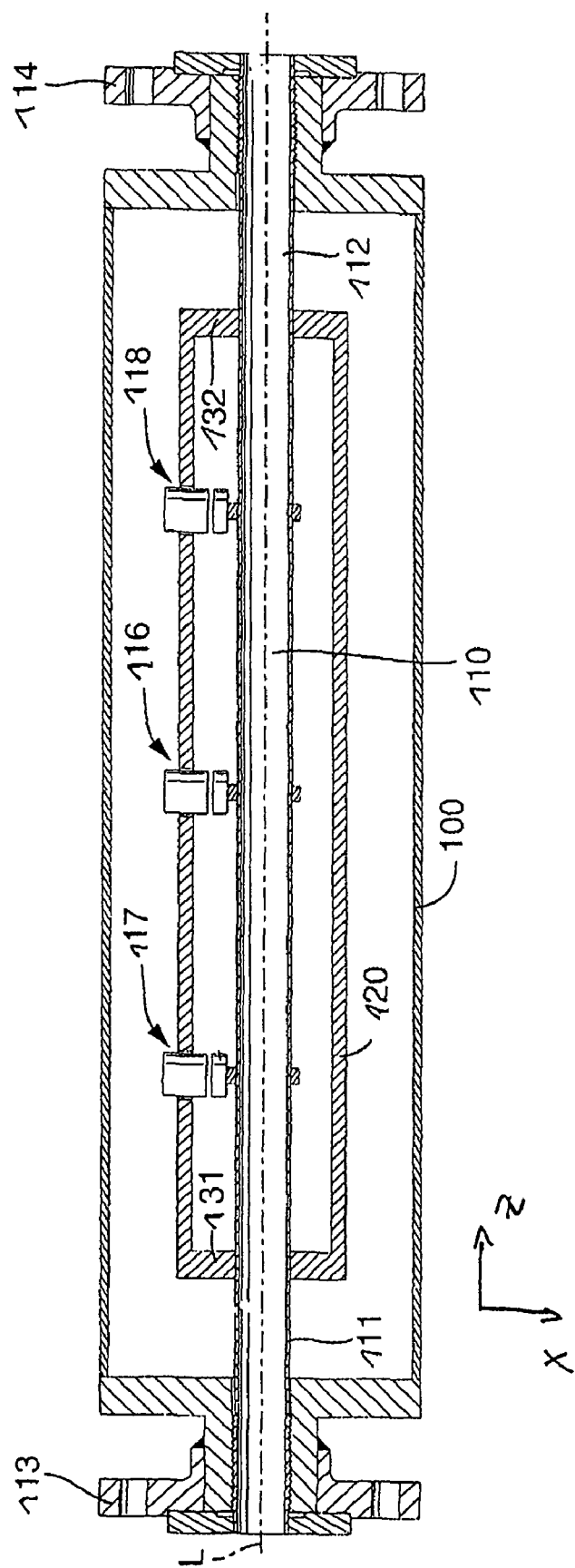
FIG. 5 shows in a perspective side view, an example of an embodiment of a measuring transducer of vibration type suited for the measuring device of FIG. 4.
Figure 6:
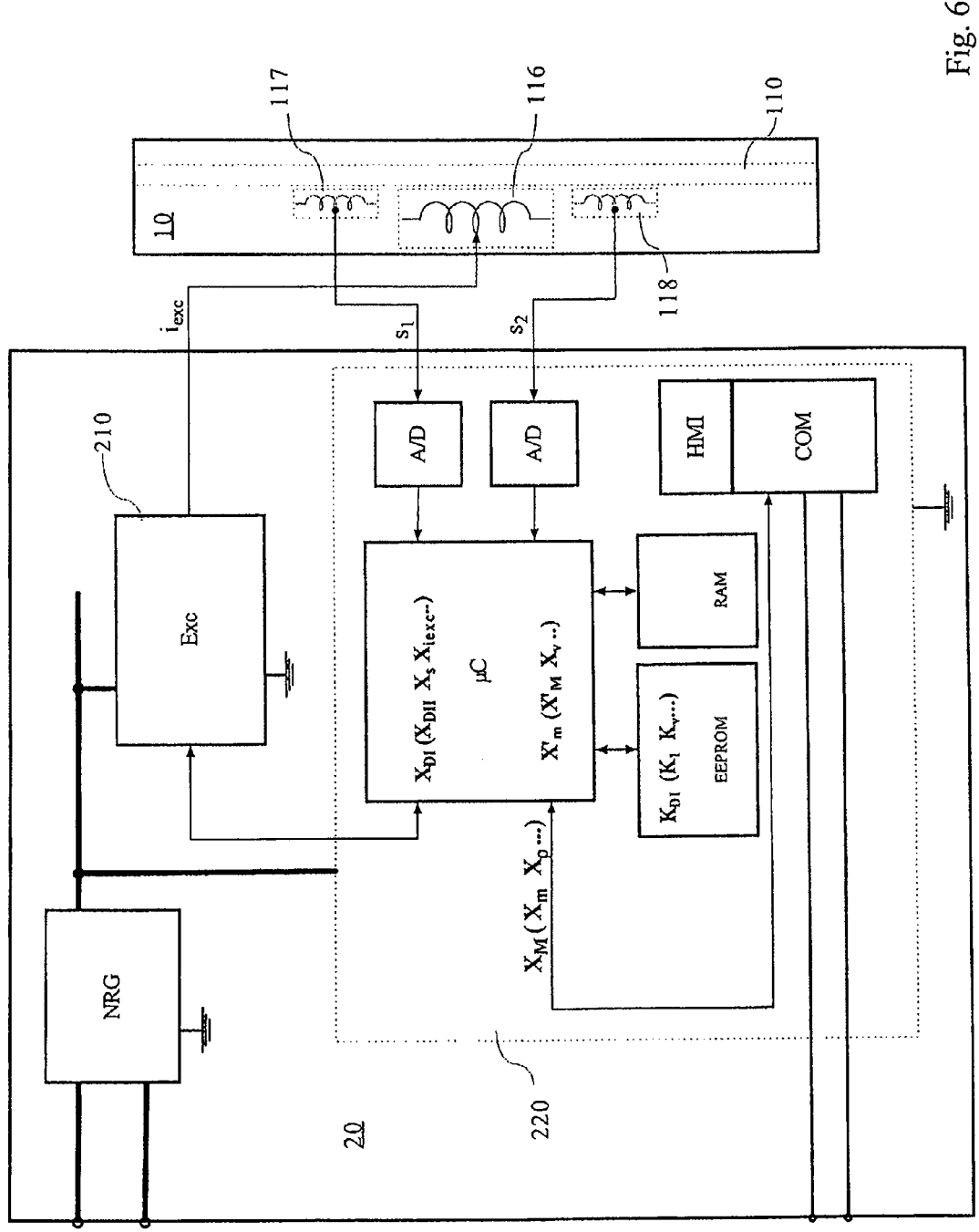
FIG. 6 shows schematically in the manner of a block diagram, an embodiment of a measuring device electronics suited for the in line measuring device of FIG. 4.

FIG. 5 shows, schematically, an example of an embodiment of a measuring transducer 10 of vibration-type suitable for the in line measuring device. The measuring transducer serves to produce, in a medium flowing through it, mechanical reaction forces, e.g. mass flow dependent, Coriolis forces, density dependent, inertial forces and/or viscosity dependent, frictional forces, which react registerably by sensor on the measuring transducer and, as a result, are measurable. On the basis of these reaction forces, in manner known to those skilled in the art, e.g. a mass flow rate, m, a density, $\rho$, and/or a viscosity, $\eta$, or therefrom derived, measured variables of the medium, are measured. The measuring transducer includes therefor an inner part, arranged in a, for example, essentially tubular or box-shaped, transducer housing 100, for actually effecting the physical-to-electrical transducing of the at least one measured variable to be registered, such as, for instance, the flow parameter, mass flow rate. Transducer housing 100 and electronics housing 200 can, as also shown in FIG. 4, be rigidly connected with one another to form a compactly constructed, in line measuring device.

For conveying the medium, the inner part includes at least one—in the example of an embodiment illustrated in FIG. 5, a single, essentially straight—measuring tube 10, which is caused to vibrate, during operation, and in such case, is deformed oscillatingly, repeatedly elastically, for instance, out of a static resting position. Here, let it be noted, however, that—although the measuring transducer in the example of an embodiment illustrated in FIG. 5 has a single, straight measuring tube, and, at least, insofar, in its mechanical construction, as well as also its principle of action, essentially corresponds about to that disclosed in the initially mentioned U.S. Pat. Nos. 4,962,671, 7,299,699, 7,073,396, 7,040,179, 7,017,424, 7,213,470, 6,840,109, 6,691,583, 6,651,513, 6,516,674, 6,397,685, 6,330,832, 6,006,609, 5,979,246, 5,945,609, 5,796,012, 5,796,010, 5,691,485, 5,531,126, 5,476,013, 5,398,554, or U.S. Pat. No. 5,291,792, —for implementing the invention, of course, also other measuring transducers of vibration-type known from the state of the art and established in industrial measurements technology can serve, especially also those with more than one measuring tube and/or with bent measuring tube. For example, the at least one measuring tube, and, insofar, also an imaginary centroidal axis of the measuring tube extending within its lumen, can, in such case, be, at least sectionally, be essentially S-, Ω-, or U-shaped or, such as e.g. in U.S. Pat. Nos. 5,287,754, 6,860,158, 6,666,098, 7,213,469, or U.S. Pat. No. 7,360,451, at least sectionally, essentially V-shaped. Examples of other measuring tube forms suitable for implementing the invention are, moreover, described in, among others, the initially mentioned state of the art, such as, for instance, U.S. Pat. Nos. 5,602,345, 5,796,011, 6,311,136, 6,758,102, 5,731,527, 5,301,557, or U.S. Pat. No. 6,920,798.

In operation of the measuring transducer, the measuring tube 10 is, such as usual in the case of such measuring transducers, excited to bending oscillations in the so-called wanted mode—, for example, at an exciter frequency, $f_{exc}$, essentially corresponding to a natural resonance frequency—, in such a manner that it bends out oscillatingly about an imaginary bending oscillation axis—here, essentially parallel to, or also coincident with, an imaginary longitudinal axis L of the measuring transducer, connecting its in- and outlet ends imaginarily—, at least partially essentially according to a natural eigenoscillation form. For minimizing disturbing influences possibly acting on the measuring tube 10, as well as also for reducing oscillatory energy possibly released from the measuring transducer to the connected process line, a counteroscillator 120 is additionally provided in the measuring transducer. This is arranged, as shown also in FIG. 5, laterally spaced from the measuring tube 110 in the measuring transducer and affixed to the measuring tube 110 at two points to form an—essentially an inlet end of the measuring tube 10 defining—first coupling zone 111# on the inlet side and to form an—essentially an outlet end of the measuring tube 110 defining—second coupling zone 112# on the outlet side. The counteroscillator 120, which, in the illustrated example of an embodiment, extends essentially parallel to the measuring tube 110 and is, in given circumstances, also arranged coaxially to this—can be, for example, tubular or also essentially box-shaped. In the example of an embodiment shown here, the counteroscillator 120 is held by means of at least one inlet-side, first coupler 131 on the inlet end 111# of the measuring tube 110 and by means of at least one outlet-side, second coupler 132 on the outlet end 112# of the measuring tube 110, especially a second coupler 132 essentially identical to the first coupler 131. Couplers 131, 132 can, in such case, be e.g. simple node plates, which are secured in corresponding manner on the inlet side and on the outlet side in each case to measuring tube 110 and to counteroscillator 120, for instance, by pressing on and/or soldering on of corresponding metal bodies, according to the initially mentioned U.S. Pat. Nos. 6,047,457 or U.S. Pat. No. 6,168,069.

As shown schematically in FIG. 5, the measuring tube 110 is additionally connected via a straight, first connecting tube piece 111 on the inlet side in the region of the first coupling zone 111# and via a straight, second connecting tube piece 112 on the outlet side in the region of the second coupling zone 112#, especially a second connecting tube piece 112 essentially identical to the first connecting tube piece 111, correspondingly, to the medium supplying—, or draining—here not shown—process line, wherein an inlet end of the inlet-side, connecting tube piece 111 forms practically the inlet end of the measuring transducer and an outlet end of the outlet-side, connecting tube piece 112 the outlet end of the measuring transducer. In advantageous manner, the measuring tube 110 and the two connecting tube pieces 111, 112 can be formed as one piece, so that e.g. a single tubular stock, or semifinished part, can serve for their manufacture. Instead of this, that measuring tube 110, inlet tube piece 111 and outlet tube piece 112 are formed of segments of a single, one piece tube, these can, in case required, however, also be produced by means of individual, subsequently joined together, e.g. welded together, stock, or semifinished parts. For manufacture of the measuring tube 10, moreover, practically any of the materials usual for such measuring transducers, such as e.g. steel, Hastelloy, titanium, zirconium, tantalum, etc., can be used.

As furthermore evident from the combination of FIGS. 4 and 5, the transducer housing 100, especially an, in comparison to the measuring tube 110, bending- and torsion-stiff, transducer housing 100, is affixed, especially rigidly affixed, to a, with respect to the first coupling zone 111#, distal inlet end of the inlet-side connecting tube piece 111 as well as to a, with respect to the second coupling zone 121#, distal outlet end of the outlet-side connecting tube piece 112. As a result, thus, the entire inner part not only is completely encased by the transducer housing 100, but, also, as a result of its eigenmass and the spring action of both connecting tube pieces 111, 112, it is also held oscillatably in the transducer housing 100. In the case of the example of an embodiment illustrated in FIG. 5, the two essentially straight, connecting tube pieces 111, 112 are so oriented relative to one another, that they extend essentially parallel to the imaginary longitudinal axis L, or to the imaginary oscillation axis of the bending oscillations of the measuring tube, or that they are both essentially aligned with the longitudinal axis L as well as also relative to one another. Since the two connecting tube pieces 111, 112 in the here illustrated example of an embodiment are essentially straight over their entire lengths, they are accordingly as a whole, relative to one another as well as relative to the imaginary longitudinal axis L, essentially oriented in alignment. Additionally to accommodating the inner part, the transducer housing 100 can additionally also serve to hold the electronics housing 200 of the inline measuring device with therein accommodated, measuring device electronics.

For the case, in which the measuring transducer is to be assembled releasably with the process line, in the form, for example, of a metal pipeline, there is additionally formed on the inlet-side connecting tube piece 111, at its inlet end, a first connecting flange 113 of the measuring transducer and on the outlet-side connecting tube piece 112, at an outlet end, a second connecting flange 114 of the measuring transducer.

The connecting flanges 113, 114 can, in such case, such as quite usual in the case of measuring transducers of the described type, also be integrated, at least partially, terminally in the transducer housing 100. In case required, the connecting tube pieces 111, 112 can, moreover, however, also be connected directly with the process line, e.g. by means of welding or brazing (hard soldering).

For exciting mechanical oscillations of the measuring tube 110, especially the bending oscillations in the wanted mode, the measuring transducer includes, additionally, an exciter mechanism 116, especially an electrodynamic exciter mechanism. This serves—operated by a correspondingly conditioned exciter signal, e.g. a periodically variable and/or impressed electrical current, or a with periodically variable and/or impressed voltage, delivered by the mentioned driver circuit 210 of the measuring device electronics 20 and, in given cases, in the interaction with their mentioned evaluating circuit 220, —to convert electrical exciter energy, or power, $E_{exc}$, fed from the driver electronics 210 into an exciter force $F_{exc}$ acting on the measuring tube 110, e.g. with pulse shape or harmonically, and deflecting this in the above-described manner. In the example of an embodiment shown here, the exciter mechanism is additionally so embodied, that an imaginary line of action of the exciter force $F_{exc}$ exerted, during operation of the exciter mechanism 116 under the influence of the exciter signal, $i_{exc}$, on the measuring tube 110 extends essentially along an imaginary central plane, or axis, of the measuring tube, perpendicular to the measuring tube longitudinal axis L. In the example of an embodiment shown here, the central plane corresponds—such as quite usual in the case of measuring transducers of the type being discussed—to that symmetry plane of the measuring tube, or also of the total measuring transducer, in which the cross section extending through the center of the measuring tube lies, and which symmetry plane, thus, is coplanar with this cross section.

Driver circuits suitable for the tuning the exciter energy $E_{exc}$ are sufficiently known to those skilled in the art and shown e.g. in U.S. Pat. Nos. 4,777,833, 4,801,897, 4,879,911 or U.S. Pat. No. 5,009,109. The exciter force $F_{exc}$ can, such as usual in the case of such measuring transducers, be bidirectional or unidirectional and, in manner known to those skilled in the art, be tuned, e.g. by means of an electrical current, and/or voltage, control circuit, with respect to its amplitude and, e.g. by means of a phase control loop, with respect to its frequency. As exciter mechanism 116, e.g. an established electrodynamic oscillation exciter can serve, which is formed by means of a, secured on the counteroscillator 120, cylindrical exciter coil, through which, during operation, a corresponding exciter current flows, and, associated therewith, is permeated by a corresponding magnetic field, as well as, at least partially plunging into the exciter coil, a permanently magnetic armature, which is affixed externally, especially centrally, on the measuring tube 110. Other examples of exciter mechanisms suitable for the in line measuring device of the invention for oscillating the at least one measuring tube are shown in, among others, also in the initially mentioned U.S. Pat. Nos. 7,017,424, 6,840,109, 6,805,012, 6,557,422, 6,092,429, 6,006,609, 4,823,614, 6,223,605 or U.S. Pat. No. 5,531,126.

In an additional embodiment of the invention, the at least one measuring tube is excited, during operation, by means of the exciter mechanism 116, at least at times, in a wanted mode, in which it executes at least partially—especially predominantly or exclusively—bending oscillations about the imaginary oscillation axis connecting in- and outlet ends of the measuring tube imaginarily with one another, for example, with a single frequency and/or a lowest of its resonance frequencies. The bending oscillations of the measuring tube have, in such case, in the region of the inlet-side coupling zone 111# defining the inlet-side end of the measuring tube, an inlet-side oscillation node, and in the region of the outlet-side coupling zone 112# defining the outlet-side end of the measuring tube, an outlet-side oscillation node. In the case of the example of an embodiment illustrated in FIG. 5, the measuring tube 110 performs the bending oscillations relative to the counteroscillator 120 and the longitudinal axis L. In the case of an exciter mechanism acting differentially on measuring tube and counteroscillator, also the counteroscillator 120 is compelled to execute simultaneously bending oscillations—here, bending oscillations essentially coplanar with the bending oscillations of the measuring tube—, and, indeed, in such a manner, that it oscillates at least partially out of phase, especially essentially with opposite phase, to the measuring tube 110 oscillating in the wanted mode. Especially, measuring tube 110 and counteroscillator 120 are, in such case, additionally so matched to one another, or so excited, that they execute during operation, at least at times, and at least partially opposite-equally, thus equal-frequency, however, essentially opposite phase, bending oscillations about the longitudinal axis L. In an additional embodiment of the invention, the exciter, or also wanted mode, frequency, $f_{exc}$, is, in such case, so set, that it corresponds as much as possible exactly to a natural eigenfrequency of bending oscillations of the measuring tube 110, for example, a smallest eigenfrequency corresponding to a bending oscillation fundamental mode. For the operationally provided case, in which the medium flows in the process line and, thus, the mass flow, or the mass flow rate, m, is different from zero, also Coriolis forces are induced in the flowing medium by means of the measuring tube 110 vibrating in the above-described manner. These, in turn, reacts on the measuring tube 110 and effect so an additional deformation of the same registerable by sensor, and, indeed, essentially according to a natural eigenoscillation form of higher modal order than the eigenoscillation serving as wanted mode. An instantaneous form of this so-called Coriolis mode superimposed on the excited wanted mode with equal frequency is, in such case, especially with respect to its amplitudes, also dependent on the instantaneous mass flow rate, m. Serving as Coriolis mode eigenoscillation form can be, such as usual in the case of such measuring transducers with straight measuring tube, e.g. the eigenoscillation form of an antisymmetric bending oscillation mode essentially coplanar with the wanted mode.

Since natural eigenfrequencies of such lateral bending oscillation modes of measuring tubes and, insofar, also the thereto tuned exciter frequency, $f_{exc}$, are, as is known, dependent in special measure also on the density, $\rho$, of the medium, also the density, $\rho$, can be directly measured by means of the in line measuring device.

In an additional embodiment of the invention, the measuring tube 110 is, for producing mass flow dependent, Coriolis forces in the flowing medium and/or density dependent, inertial forces, consequently, excited, at least at times, with an exciter frequency, $f_{exc}$, which corresponds, as much as possible, exactly to a lowest natural eigen, or resonance, frequency of all bending oscillation modes of the measuring tube 110, so that, thus, the measuring tube 110 oscillating in the wanted mode, but through which fluid is not flowing, is essentially symmetrically bent out with respect to the central plane, or axis, perpendicular to the measuring tube longitudinal axis L, and has, in such case, a single oscillatory antinode. In addition to the lateral bending oscillations, the here shown inner part can, for example, also, for producing viscosity dependent shear forces in the flowing medium be operated, at least at times, in a torsional oscillatory mode, and, indeed, in such a manner, that the measuring tube 110 is oscillatingly recurringly twisted with a natural torsion eigenfrequency about a torsion oscillation axis extending parallel to, or coinciding with, the measuring tube longitudinal axis L, essentially according to a natural torsional oscillation form; compare, for this, e.g. also U.S. Pat. Nos. 5,253,533, 6,006,609, 6,840,109, 7,017,424 or EP A 1 158 289. The exciting of the torsional oscillations can, in such case, also be effected by means of the one oscillation exciter driving the bending oscillations, and, indeed, both, in time, offset with respect to the bending oscillations of the wanted mode, or, however, especially in the case of oscillation frequencies distinguishable from one another, also simultaneously with the bending oscillations in the wanted mode, for instance, according to the method proposed in U.S. Pat. Nos. 6,840,109 or U.S. Pat. No. 7,017,424.

For causing the measuring tube 110 to vibrate, the exciter mechanism 116 is fed, such as already indicated, by means of a likewise oscillating, exciter signal $i_{exc}$, of adjustable exciter electrical current amplitude and of adjustable exciter frequency, $f_{exc}$, so that, during operation, a corresponding exciter current flows through the exciter coil of the, here, single oscillation exciter acting on the measuring tube and, in corresponding manner, the magnetic field required for moving the measuring tube is produced. The exciter signal, or its exciter current $i_{exc}$, can be e.g. harmonic, multifrequent or also rectangularly shaped. The exciter frequency, $f_{exc}$, of the exciter current, $i_{exc}$, required for maintaining the bending oscillations of the measuring tube 110 can be, in the case of the measuring transducer illustrated in the example of an embodiment, in advantageous manner, so selected and tuned, that the laterally oscillating measuring tube 110 essentially oscillates in a bending oscillation fundamental mode with a single oscillatory antinode.

The driver circuit can be embodied e.g. as a phase control loop (PLL), which, in manner known to those skilled in the art, is used, on the basis of a phase difference, measured between at least one of the oscillation measurement signals $s_1$, $s_2$ and the to be adjusted, or the instantaneously measured, exciter current of the exciter signal, $i_{exc}$, to adjust its exciter frequency, $f_{exc}$, continuously to the instantaneous eigenfrequency of the desired wanted mode. The construction and application of such phase control loops for driving measuring tubes at one of their mechanical eigenfrequencies is described at length e.g. in U.S. Pat. No. 4,801,897. Of course, also other driver circuits known to those skilled in the art can be used, for example, also according to those of the initially mentioned state of the art; compare, for instance, U.S. Pat. Nos. 5,024,104, 5,050,439, 5,804,741, 5,869,770, 6,073,495 or U.S. Pat. No. 6,311,136. Additionally, reference is made to the application of such driver circuits for measuring transducers of vibration-type in the measurement transmitters of series "PROMASS 83", such as available from the assignee, for example, in connection with measuring transducers of series "PROMASS I". Their driver circuit is, for example, so embodied, that the lateral bending oscillations in the wanted mode are controlled to a constant amplitude, thus an amplitude also largely independent of the density, ρ.

For registering oscillations of the measuring tube 110, the measuring transducer additionally includes a sensor arrangement, which is formed by means of at least one—here arranged on the inlet side of the measuring tube—oscillation sensor 117 for producing at least one primary signal of the measuring transducer representing vibrations, especially bending oscillations, of the measuring tube 110 and serving, insofar, as a first oscillation measurement signal $s_1$. As usual in the case of in line measuring devices of the type being discussed, the measuring transducer can additionally have at least one—, for example, placed on the outlet side on the measuring tube and/or constructed essentially equally to the oscillation sensor 117—additional, second oscillation sensor 118, which delivers at least one further primary signal of the measuring transducer representing, for example, outlet-side vibrations of the at least one measuring tube 110, and insofar, serving, thus, as a second oscillation measurement signal $s_2$. The two oscillation sensors 117, 118 are so arranged spaced from one another in the measuring transducer 110 along the measuring tube 110, especially in each case at a same distance from the central plane of the measuring tube 110, that, by means of the sensor arrangement, both inlet-side as well as also outlet-side vibrations of the measuring tube 10 are locally registered and transduced into the corresponding oscillation measurement signals $s_1$, $s_2$. In the example of an embodiment shown here, the first oscillation sensor 117 on the inlet side and the second oscillation sensor 118 on the outlet side are arranged on the at least one measuring tube, and, indeed, equally spaced from the at least one oscillation exciter as the first oscillation sensor 117.

Used as oscillation sensors 117, 118 can be e.g. established electrodynamic velocity sensors measuring the oscillations relatively, especially differentially, to the counteroscillator, for instance, according to the initially mentioned U.S. Pat. Nos. 7,017,424, 6,840,109, 4,777,833 or the not pre-published DE102007062397. In case required, additionally, in manner known to those skilled in the art, still other sensors required for measuring and/or operation of the measuring transducer can be provided, such as e.g. additional acceleration sensors arranged on the counteroscillator 120 and/or on the transducer housing 100 (compare, for this, also U.S. Pat. No. 5,736,653), or e.g. temperature sensors and/or strain gages arranged also on the measuring tube 110, on the counteroscillator 120 and/or on the transducer housing 100 (compare., for this, also U.S. Pat. No. 4,768,384, 7,040,179 or WO A 00/102816).

Both of the oscillation measurement signals $s_1$, $s_2$ delivered by the sensor arrangement, which each have a signal frequency corresponding to an instantaneous oscillation frequency, $f_{exc}$, of the measuring tube 110 oscillating in the wanted mode, are, such as shown in FIG. 5, fed to the measuring device electronics 20, where they are, in manner known to those skilled in the art, by means of a corresponding measuring and evaluating circuit 220, first preprocessed, especially preamplified, filtered and digitized, in order then to be able to be suitably evaluated. As measuring and evaluating circuit 220, in such case, programmable circuits already applied and established in conventional Coriolis mass flow measuring devices for the purpose of ascertaining mass flow rates and/or totaled mass flows, etc., can continue to be used, for example, also such according to the initially mentioned state of the art. In an additional embodiment of the invention, the measuring and evaluating circuit 220 is, such as schematically presented in FIG. 5, implemented accordingly also by means of a microcomputer μC provided in the measuring device electronics 20, for example, implemented by means of a digital signal processor (DSP), and by means of program code correspondingly implemented and running in these. The program code can be stored persistently e.g. in a non-volatile memory EEPROM of the microcomputer and during the starting of the same loaded into a volatile memory RAM integrated e.g. in the microcomputer. For such applications, suitable processors are e.g. those of type TMS320VC33, such as are available from the firm Texas Instruments Inc. Of course, the oscillation measurement signals $s_1$, $s_2$, such as already indicated, are, for processing in the microcomputer, converted by means of corresponding analog to digital converters ND of the measuring and evaluating circuit 220 into corresponding digital signals; compare, for this, for example, the initially mentioned U.S. Pat. Nos. 6,311,136 or U.S. Pat. No. 6,073,495 or also the aforementioned measurement transmitter type "PROMASS 83".

The measuring and evaluating circuit 220 serves, according to an embodiment of the invention, especially, on the basis of a detected phase difference between the oscillation measurement signals $s_1$, $s_2$ generated in the case of measuring tube 110 oscillating partially in the wanted and Coriolis modes, recurringly, to ascertain a mass flow measured value $X_m$, which represents, as exactly as possible, the mass flow rate, m, to be measured for the medium conveyed through the measuring transducer. Alternatively thereto or in supplementation thereof, the measuring and evaluating circuit serves, for example, derived from a current mass flow value $X_m$ and/or a plurality of earlier sequentially produced and/or mass flow measured values, to ascertain a mass measured value $X_M$, which, represents, instantaneously, a totaled mass flow, M, which, in turn, corresponds to a mass of the medium to be measured, which, as a whole, flows through the measuring transducer during a time interval, such as, for instance, the initially mentioned filling period, $\Delta T_M$. The time interval operative for ascertaining the mass measured value $X_M$ can be initially predetermined, for example, on the part of the user and/or recurringly ascertained, during operation, and so be correspondingly matched, per se, to changing process conditions, such as, for instance, varying closing times of valves controlled by means of the in line measuring device and/or varying properties of the medium to be measured and/or changed package sizes of the containments in each case to be filled, etc. In the case of application of the in line measuring device for control of filling procedures of the initially named type, the current mass measured value $X_M$ can in each case be compared with the predetermined amount, or mass, $M_{DESIRED}$, to be metered for the respective filling process into the momentarily present containment, in order, upon then determined reaching of this input, $M_{DESIRED}$, to cause a control command for a valve controlling the media flow correspondingly ending the filling of the momentarily present containment.

Furthermore, the measuring, evaluating circuit can also serve to generate, derived from an oscillation frequency of lateral bending oscillations, for example, also those in the wanted mode, of the at least one measuring tube, measured, for example, on the basis of at least one of the oscillation measurement signals $s_1$, $s_2$, a density measured value $X_\rho$, which represents, instantaneously, a density, $\rho$, to be measured for the medium. Additionally, the measuring and evaluating circuit can, such as quite usual in the case of in line measuring devices of the type being discussed, in given circumstances, also be used to ascertain, derived from the driver signal, $i_{exc}$, which, as is known, can serve also as a measure for an apparent viscosity or also a viscosity density product of the medium conveyed in the measuring tube, a viscosity measured value $X_\eta$, which represents, instantaneously, a viscosity of the medium; compare., for this, also U.S. Pat. Nos. 7,017, 424, 6,840,109 or U.S. Pat. No. 6,651,513. It is, in such case, for those skilled in the art, directly recognizable, that the in line measuring device can ascertain the individual measured values [$X_m$, $X_M$, $X_\rho$, $X_\eta$ . . . ] for the different primary measured variables [m, M, $\rho$, $\eta$ . . . ], usually periodically, or with a fixedly predetermined updating rate, recurringly, indicated, in given cases, by means of the display and service unit HMI on-site and/or stored interimly in one of the mentioned memories EEPROM, or RAM, even, in each case, in a common measuring cycle, thus with a same updating rate as well as also, in given circumstances, with different updating rates. By way of example, a highly accurate measuring of the most often significantly varying mass flow rate, m, or the therefrom derived, totaled mass flow, M, usually requires a very short sampling time, $T_A$, or a very high, essentially constant, updating rate, $f_A=1/T_A$, especially also during a period of time, $n \cdot T_A$, extending over a number of individual measuring cycles, while the, in comparison therewith, over a longer period of time most often rather little variable density, $\rho$, and/or viscosity, $\eta$, of the medium, can, in given circumstances, be updated in greater time intervals. Furthermore, it can be directly assumed, that measured values ascertained by means of the measuring device electronics can also be, at least temporarily, also interimly stored in the measuring device electronics, for example, in the mentioned EEPROM memory and/or RAM memory, and so be held sufficiently long for subsequent uses.

Figure 7:
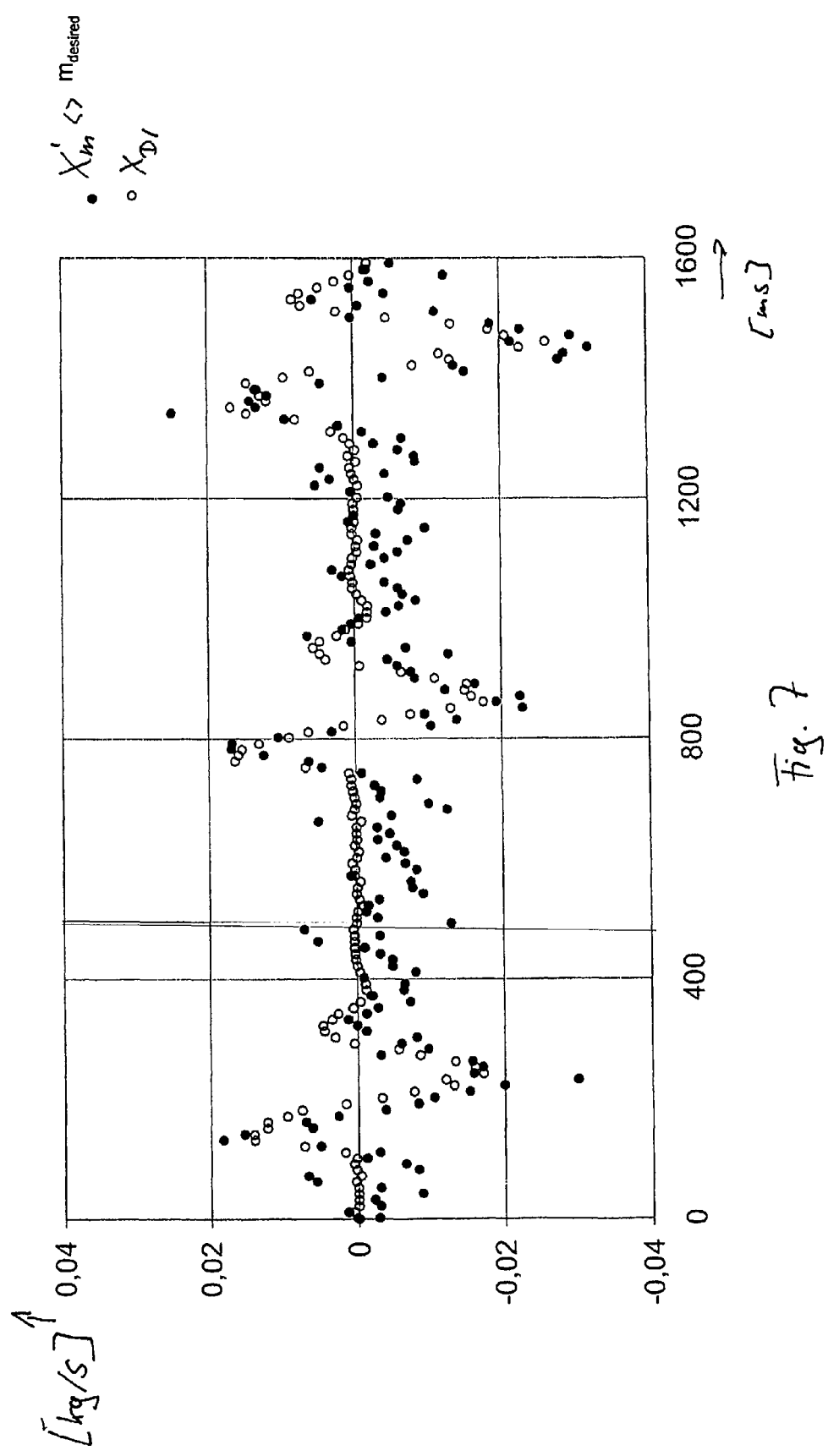
FIG. 7 shows graphically, the mass flow rates experimentally ascertained with an in line measuring device of FIG. 4.
Figure 8:
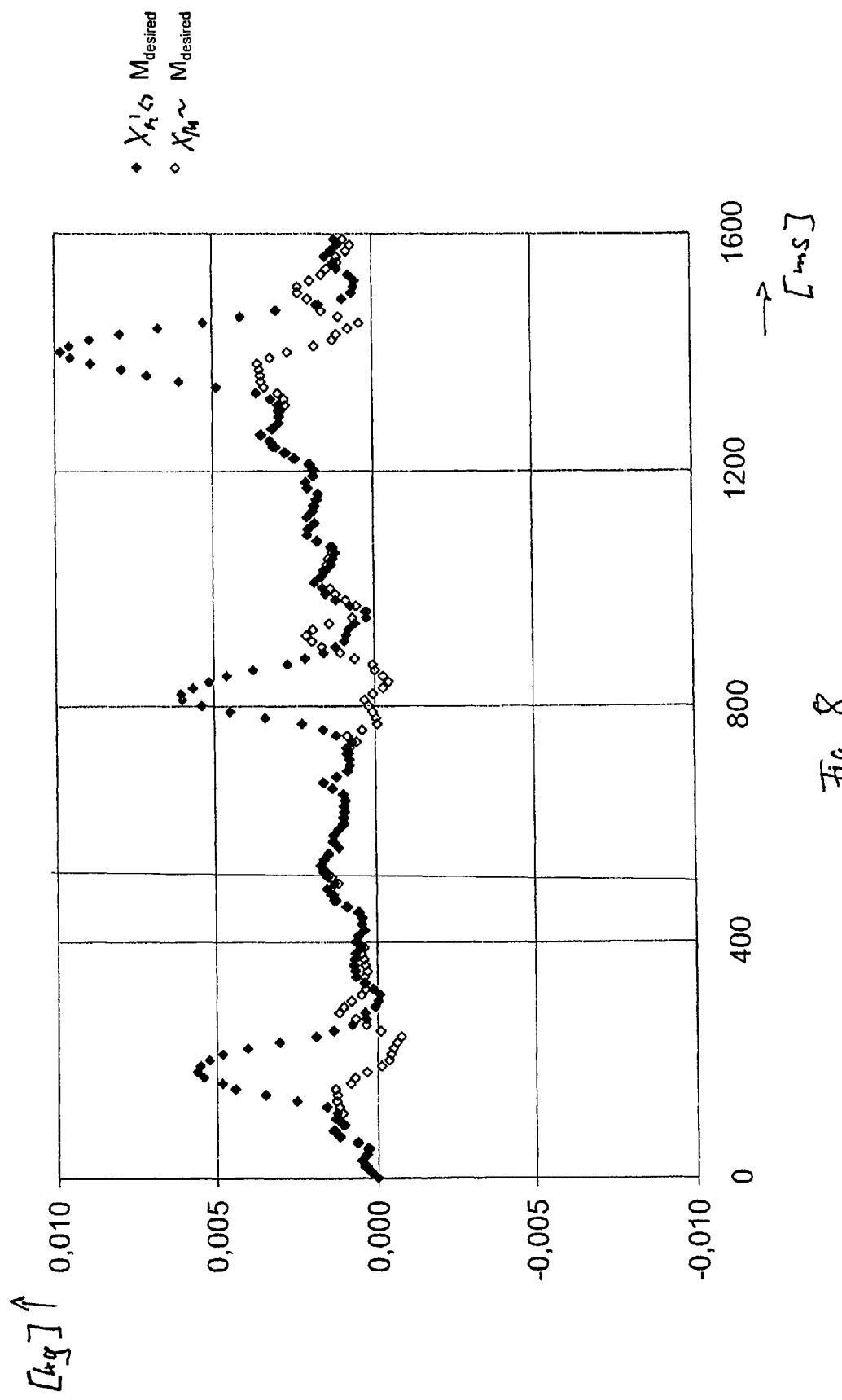
FIG. 8 shows graphically, the totalized mass flows experimentally ascertained with an in line measuring device of FIG. 4.

As already mentioned a number of times, especially in the case of presence of a two- or multiphase medium, or a medium carrying impurities, such as, for instance, gas bubbles or solid particles, and/or an, in considerable measure, inhomogeneous medium, the, in conventional manner, ascertained, measured values of in line measuring devices of the type being discussed can be subject to possibly considerable inaccuracies as a result of asymmetric dampings of oscillations of the measuring tube and the, associated therewith, zero-point errors as a result of fluctuating damping of antisymmetric bending oscillations. On the basis of these considerations, such in conventional manner—thus without taking into consideration such asymmetric dampings induced by the medium—generated measured values [$X'_m$, $X'_M$, . . . ], especially also the mass flow measured value output as primary measured value of such in line measuring devices, or the mass measured value, must be correspondingly corrected, in order that the respective untimate primary measured values [$X_m$, $X_M$, . . . ] actually be obtained with a high accuracy of measurement desired for in line measuring devices of the type being discussed. A possible behavior of the zero-point with respect to time, relevant for ascertaining the mass flow measured value $X_m$, thus the uncorrected and, insofar, provisional mass measured value $X'_m$ ascertained in the case of actually not flowing medium, $m_{DESIRED}=0$, under influence of inhomogeneities flowing through the measuring transducer—recorded with an in line measuring device of type "PROMASS 83 I DN 50"—is shown, by way of example, in FIG. 7, while FIG. 8 shows, recorded with the same in line measuring device—here with the passage of a total of three, spaced in time, gas bubbles—behavior with respect to time of the zero-point relevant for ascertaining the mass measured value $X_M$, thus the in the case of actually not flowing medium, $M_{DESIRED}=0$, ascertained, provisional mass measured value $X'_M$.

In the case of the in line measuring device of the invention, it is, consequently, additionally provided, that the measuring and evaluating circuit 220 of the measuring device electronics 20 ascertains, during operation, at least at times, a damping value $X_{DI}$ of first type—, in given circumstances, also internally stores—which represents, instantaneously, a change within of a predeterminable time interval, $\Delta T_M$, of the damping opposing vibrations of the measuring tube. This change of the damping of the vibrations of the at least one measuring tube represented by the damping value $X_{DI}$ can be induced, for example, as a result of a change of a spatial distribution of inhomogeneities, such as, for instance, gas bubbles and/or solid particles, in the medium flowing through the at least one measuring tube and/or by a change of the concentration of inhomogeneities, such as, for instance, gas bubbles and/or solid particles, in the medium flowing through the at least one measuring tube and, insofar, can correspond to this.

Serving as information base for the damping value $X_{DI}$ of first type can be, in such case, for example, one or also a number of the oscillation measurement signals $s_1$, $s_2$ delivered by the sensor arrangement and/or the at least one exciter signal, $i_{exc}$. Alternatively thereto or in supplementation thereof, also internal measuring and/or operating data corresponding to the signals can be used for ascertaining the damping value $X_{DI}$ of first type, such as, for instance, the driver signal $i_{exc}$, at current setting values of the driver circuit 210 correspondingly matching instantaneous oscillation characteristics of the measuring transducer 10. Behavior with respect to time of the damping measured value $X_{DI}$ of first type—likewise experimentally ascertained by means of the in line measuring device by the type "PROMASS 83 I DN 50"—corresponding to the behavior with respect to time of the zero-point in FIG. 7 is shown suitably synchronized in FIG. 7.

For the above-described case, in which the measuring device electronics 20 recurringly produces a mass flow measured value $X_m$, the correction of the provisional mass flow measured value $X'_m$ can be implemented in the measuring device electronics in very simple manner on the basis of the formula:

$$X_m = X'_m - K_1 \cdot \frac{X_{DI}}{T_A}. \quad (1)$$

For the case, in which the measuring device electronics—alternatively to or in supplementation of the output of the mass flow measured value $X_m$ as primary measured value—ascertains a recurringly updated, mass measured value $X_M$ as primary measured value of the in line measuring device, this can occur by means of the measuring and evaluating circuit e.g. through numerical solution of one of the relationships:

$$\begin{aligned} X_M &= \sum_{t1}^{t2} (X'_m \cdot T_A - K_1 \cdot X_{DI}) \\ &= X'_M - K_1 \cdot X_{DI} \\ &= \sum_{t1}^{t2} (X_m \cdot T_A), \end{aligned} \quad (2)$$

insofar, thus selectively with application of the provisional mass flow measured value $X'_m$, or the provisional mass measured value $X'_M$ or through simple integration of earlier ascertained, correct mass flow measured values $X_m$. Latter case offers, among others, the advantage, that the current mass measured value is always also the correct mass measured value $X_M$ and, as a result, is especially well suited to serve as control variable for a highly precise metering. The measuring device parameter K1 applied, in such case, is a characteristic value of the in line measuring device dependent on the actual construction of the measuring transducer, especially also its oscillatory behavior in the case of asymmetric damping induced by the medium, or correspondingly representing its influence on the zero-point of the in line measuring device, which is experimentally ascertained, for example, during a wet calibration of the in line measuring device, thus in the case of supplying the measuring transducer with a medium of known and/or impressed, mass flow rate, $m \rightarrow m_{DESIRED}$, and known properties, such as density, $\rho$, and viscosity, $\eta$, etc., and/or which suitably can be ascertained in dialog with a user interacting with the in line measuring device, for example, via display and service unit HMI, and, indeed, in such a manner that a deviation of the in each case to be ascertained primary measured value ($X_m$, $X_M$) from the therefor instantaneously predetermined desired value ($m \rightarrow m_{DESIRED}$, $M \rightarrow M_{DESIRED}$) is as small as possible. Behavior with respect to time corresponding to the behavior with respect to time of the zero-point according to FIG. 8 is presented in FIG. 8 for the corrected mass measured value $X_M$ suitably synchronized and likewise experimentally ascertained by means of the in line measuring device of type "PROMASS 83 I DN 50". A significant improving of the zero-point behavior of the associated in line measuring device is shown. Only a very small deviation of the mass measured value $X_M$ from the ideal zero line for the actual totaled mass flow, $M_{DESIRED}=0$, of the experiment is clearly recognizable.

The ascertaining of the damping value $X_{DI}$ can occur, for example, requirements controlled, for instance, in the case of drastically changing process conditions during operation, or, however, also periodically recurringly, for instance, with the updating rate, $f_A=1/T_A$ applied for generating the mass flow measured value, and, insofar, can occur quasi continuously. Furthermore, the damping value $X_{DI}$ of first type can be displayed on-site and/or, in given cases, also be transmitted to the mentioned electronic data processing system, for example, for the purpose of application in another, same type, in line measuring device in the same process, or in the same filling plant and/or for the purpose of further processing in the context of a measuring device inclusive or plant wide diagnosis. In an additional embodiment of the invention, the measuring device electronics is, consequently, additionally so configured, that it generates, in given cases, by means of the at least one damping value $X_{DI}$ of first type, an alarm, which signals, that the medium has a quality deviating from a corresponding specification, especially a maximum allowable fraction of entrained impurities, and/or which signals, that the in line measuring device is operating outside of a specification predetermined therefor. The generating of such an alarm can be accomplished, for example, by a simple comparison, performed recurringly during operation, of the current damping value $X_{DI}$ with an earlier fixed therefor, threshold value correspondingly reflecting the alarm provoking situation. The threshold value suitably representing the particular alarm stage for the damping value $X_{DI}$ of first type can, for example, be experimentally ascertained in the course of a wet calibration of the in line measuring device performed, in given cases, also on-site.

In an additional embodiment of the invention, the measuring and evaluating circuit of the measuring device electronics, consequently, ascertains, during operation, on the basis of at least one of the oscillation measurement signals $s_1$, $s_2$, recurringly, an oscillation measured value, $X_S$, which represents an oscillation amplitude of oscillations of the vibrating measuring tube and/or an effective value thereof, especially of the bending oscillations in the wanted and Coriolis modes. Additionally, it is provided, that the measuring device electronics, during operation, recurringly, on the basis of at least one of the oscillation measurement signals $s_1$, $s_2$ and/or on the basis of the exciter signal, $i_{exc}$, ascertains an excitation measured value, $X_{iexc}$, which represents, instantaneously, an exciter force, or power, maintaining vibrations of the measuring tube, especially the bending oscillations in the wanted and Coriolis modes. Serving as excitation measured value, $X_{iexc}$, can be, accordingly, for example, an electrical current amplitude of the exciter signal $i_{exc}$, and/or an electrical current effective value of the exciter signal, $i_{exc}$, set by means of the driver circuit and/or instantaneously measured and correspondingly digitized.

Based on the oscillation measured value, $X_S$, and the excitation measured value, $X_{iexc}$ and, insofar, also based on driver signal, $i_{exc}$, and the oscillation measurement signals $s_1$, $s_2$, the measuring device electronics 20 ascertains in an additional embodiment of the invention, during operation, for example, also with a higher updating rate than the mass flow value and/or the mass value, recurringly, a damping value $X_{DII}$ of second type, which represents, instantaneously, a damping of vibrations in the wanted mode of the at least one measuring tube excited by means of the exciter mechanism 116—here, of bending oscillations about the imaginary bending oscillation axis of the measuring transducer 10 symmetric with respect to the mentioned central plane of the at least one measuring tube.

Serving as damping value $X_{DII}$ of second type can be, in such case, a recurringly calculated ratio, $X_{iexc}/X_S$, of the excitation measured value, $X_{iexc}$, to the oscillation measured value $X_S$, for example, thus a quotient, which is calculated by a division executed by means of the microcomputer μC of the current excitation measured value, $X_{iexc}$, by the, in each case, current oscillation measured value, $X_S$, or, however, also a time average value formed from a plurality of such quotients ascertained one after the other. Oscillation measured value, $X_S$, and excitation measured value, $X_{iexc}$, can be ascertained therefor, for example, with the same predetermined updating rate, $f_A=1/T_A$, as the mass flow value $X_m$, or, in case required, also with an essentially higher, for example, at least 5-times higher, updating rate periodically recurringly. In the case of the here illustrated type of measuring transducer with oscillation exciter acting centrally on the measuring tube and oscillation sensors arranged symmetrically thereto, the quotient $X_{iexc}/X_S$ is proportional to that damping of vibrations of the at least one measuring tube, which is likewise symmetric with respect to the imaginary central plane of the at least one measuring tube, i.e. it represents exactly that modal part of the total damping instantaneously opposing the measuring tube oscillations, which corresponds to the wanted mode, or is developed symmetrically in the aforementioned sense.

The currently ascertained damping value $X_{DII}$ of second type can be stored interimly in the mentioned volatile memory RAM of the microcomputer μC and so be held available for further calculations—together with one or a plurality of such damping values of second type ascertained at earlier measurement points in time, or in different measuring cycles, and equally stored. Such measuring cycles, or corresponding measurement points in time, especially of interest for calculating the damping value $X_{DII}$ of second type and, insofar, also the damping value $X_{DI}$ of first type, include, such as already mentioned, for example, those measuring cycles, which correspond—in the case of use of the in line measuring device in a filling process—to an operating point in time, $t_{STOP}$, corresponding to an end point in time of a filling procedure, and/or those measuring cycles, which, in result, deliver a current mass flow measured value, or a current mass value, corresponding to a current measurement point in time, $t_i$. Moreover, a measuring cycle preceding, especially directly preceding, a last named measuring cycle leading is especially of interest, and/or—in the case of use of the in line measuring device in a filling process—also that measuring cycle, which corresponds to a starting point in time, $t_{START}$, of a filling procedure.

In an additional embodiment of the invention, the damping value, $X_{DI}$, of first type is calculated by means of a difference, $\Delta X_{DII}=X_{DII,t2}-X_{DII,t1}$, calculated in the measuring device electronics, between two damping values $X_{DII,t1}$, $X_{DII,t2}$, of second type generated during various, for example, also directly sequential, measuring cycles. In such case, the damping represented by the damping value $X_{DI}$ of first type corresponds in good approximation to an antisymmetric damping of the vibrations of the at least one measuring tube totaled over the time interval, $\Delta T_M = t_2-t_1$,—lastly an antisymmetric damping determining the zero-point error of the type being discussed. At least for the here illustrated case, in which the exciter mechanism acts essentially centrally on the measuring tube, the so derived damping value $X_{DI}$ of first type represents with good approximation also that damping, which opposes the bending oscillations corresponding to the Coriolis mode.

For the purpose of calculating the damping value $X_{DI}$ of first type of such damping values $X_{DII,t1}$, $X_{DII,t2}$, of second type corresponding to different measurement points in time $t_1, t_2, \ldots$, additionally a measuring device parameter, $K_{DI}$, ascertained during a calibration of the in line measuring device and/or recurringly during operation, is held in the measuring device electronics, for example, internally stored in the mentioned non-volatile memory of the measuring device electronics 20. With application of the measuring device parameter, $K_{DI}$, as well as two damping values $X_{DII},t_1$, $X_{DII},t_2$, of second type, the damping value, $X_{DI}$, of first type can be calculated in very simple manner, e.g. based on one of the formulas:

$$\begin{aligned} X_{DI} &= K_{DI} \cdot \Delta X_{DII} \\ &= K_{DI} \cdot (X_{DII,t2} - X_{DII,t1}) \\ &= K_{DI} \cdot \left( \frac{X_{iexc,t2}}{X_{S1,t2}} - \frac{X_{iexc,t1}}{X_{S1,t1}} \right) \end{aligned} \quad (3)$$

In this way, the antisymmetric damping influencing the zero-point is ascertained with a sufficiently high accuracy for compensation of its influence on the primary measured values, such as, for instance, the mass flow measured value $X_m$ or the mass measured value $X_M$.

The measuring device parameter, $K_{DI}$, applied, in such case, is a characteristic value of the in line measuring device, which moderates between, on the one hand, the—practically directly measurable—symmetric damping ($X_{iexc}/X_S$, $\Delta X_{DII}, \ldots$) represented by the damping value $X_{DII}$ of second type and, on the other hand, the damping value $X_{DI}$ of first type. The measuring device parameter, $K_{DI}$, —possibly dependent to a slight degree also on the actual installed situation of the measuring transducer and/or the properties of the medium to be measured, or also on a, during operation, expected impurities loading of the medium conveyed in the at least one measuring tube—can, for example, be experimentally ascertained using the measuring device electronics during a wet calibration of the in line measuring device on-site, thus with supplying of the measuring transducer with a medium of known and/or impressed, mass flow rate, $m \rightarrow m_{DESIRED}$, which is loaded with purposely varied impurity levels to be expected in conjunction with the particular application. Alternatively or in supplementation, measuring device parameter $K_{DI}$ can be suitably ascertained in dialog with a user interacting with the in line measuring device, for example, also by selection, or input, of an application typical, numerical value. In the case of application of the in line measuring device in conjunction with media of physical properties fluctuating in considerable measure, such as regards, for instance, the density, ρ, the viscosity, η, the composition, the loading with impurities, etc., in given cases, also, during operation of the in line measuring device, a repeated adapting of the measuring device parameter, $K_{DI}$, to the medium currently to be measured, or to a current process regime, can be required. Such possibly required adaptations of the measuring device parameter, $K_{DI}$, can be implemented, for example, in the course of repeated wet calibration of the in line measuring device on-site and/or through corresponding specification on the part of a user interacting with the in line measuring device. In such case, the measuring device parameter $K_{DI}$ is so selected, that, in the case of known and/or impressed mass flow rate, $m_{DESIRED}$, a deviation of the primary measured value, for instance, the mass flow measured value $X_m$, or the mass measured value, $X_M$, therefrom finally is minimal. This can, for example, occur in such a manner, that the measuring device parameter, $K_{DI}$, is so selected, or interactively altered—by the user and/or automatically through the measuring device electronics—, until a test series of the respective primary measured value ascertained during a predetermined period of time of medium flowing through the measuring transducer results in a minimal scattering and/or a largely linear behavior and/or a uniformly monotonic behavior. The ascertaining of the measuring device parameter, $K_{DI}$, can, in such case, be significantly simplified by having the medium flow uniformly and/or with constant flow velocity, v, through the measuring transducer. For the purpose of reducing the calibration effort for the entire plant, the measuring device parameter, $K_{DI}$, can additionally also be transmitted to an in line measuring device in the same process, or to an in line measuring device of equal type installed in the same plant, in order there to be used, likewise for correction of its zero-point. Since a plurality of applications are similar, at least with respect to the form of the typically arising, asymmetric dampings, as well as also with respect to their influence on the primary measured values, it is additionally also an option, suitably to ascertain the measuring device parameter, $K_{DI}$, for typical application cases earlier at the manufacturer and to provide the user a set of a few default measuring device parameters, from which during the start-up of the in line measuring device on-site and with knowledge of the actual process conditions, only the best suitable measuring device parameter, $K_{DI}$, needs to be selected.

In an additional embodiment of the invention, it is provided, that the damping value, $X_{DI}$, of first type ascertained by means of the measuring device electronics is produced in such a manner, that it represents a change with respect to time of the damping of vibrations of the at least one measuring tube induced by the flowing medium, especially at least partially also a damping of bending oscillations symmetric with respect to the central plane and/or with respect to the line of action of the exciter force exerted by the exciter mechanism on the measuring tube under the influence of the exciter signal, or at least partially also the damping of excited bending oscillations in the wanted mode. For such purpose, the measuring device electronics, based on two or more, in time, one after the other generated damping values, $X_{DII}$, of second type ascertains, at least at times, a derivative with respect to time of the damping represented by said damping values, $X_{DII}$, in each case, for example, based on a difference quotient, $\Delta X_{DII}/T_A$, representing the derivative with respect to time of the symmetric damping. A difference quotient, $\Delta X_{DII}/T_A$, suitable as damping value, $X_{DI}$, of first type can be ascertained, in simple manner, for example, by a division performed in the microcomputer of the difference, $\Delta X_{DII} = X_{DII,t2} - X_{DII,t1}$, by the instantaneously set, sampling time, $T_A$, or by a multiplication performed in the microcomputer of the difference, $\Delta X_{DII} = X_{DII,t2} - X_{DII,t1}$, with the instantaneously set updating rate, $f_A$, for the mass flow measured value, or the mass measured values.

Further investigations on in line measuring devices of the type being discussed have shown, that the primary measured values, especially the mass flow measured value, $X_m$, or the mass measured values $X_M$, ascertained with application of the damping value $X_{DI}$ of first type reflecting the influence of antisymmetric damping of the vibrations of the measuring tube on the accuracy of measurement, can be ascertained yet more exactly, when this occurs also under taking into consideration a, for example, instantaneous and/or averaged over time, flow velocity, v, of the medium; this, especially, also in such cases of application, in the case of which the flow velocity, v, and/or a measure of a possible loading of impurities in the medium conveyed in the at least one measuring tube, and, associated therewith, also the damping value $X_{DI}$ of first type can fluctuate in unforeseeable manner and/or in considerable measure.

For such purpose, according to an additional embodiment of the invention, it is additionally provided, that the measuring device electronics internally stores, during operation, at least at times, at least one velocity measured value $X_v$, for instance, in one of the mentioned memories EEPROM and/or RAM. The velocity measured value Xv can be ascertained externally of the in line measuring device, e.g. by means of an in line measuring device in the same process, or an in line measuring device of the same type installed in such plant or also by means of a flow measuring device of another type, and can be transmitted subsequently via a data transmission system to the measuring device electronics. Alternatively thereto or in supplementation thereof, the measuring device electronics can ascertain the velocity measured value $X_v$, during operation, also internally recurringly, for example, on the basis of the at least one oscillation measurement signal $s_1$, $s_2$ and/or by means of the exciter signal, $i_{exc}$, or on the basis of therefrom derived measured values [$X_m, X_M, X_\rho, \ldots$]. Suitable measured values [$X_m, X_M, X_\rho, \ldots$] for ascertaining the velocity measured value X, are, for example, the current density measured value, the in the preceding measuring cycle ascertained and, thus, still current, mass flow measured value $X_m \rightarrow X_{m, ti-1}$, or the in the preceding measuring cycle ascertained and, thus, likewise still current, mass measured value $X_M \rightarrow X_{M, ti-1}$. Alternatively thereto or in supplementation thereof, the velocity measured value $X_v$ can also be ascertained on the basis of provisional measured values [$X'_m, X'_M, \ldots$], such as, for instance, the current provisional mass flow measured value $X'_m \rightarrow X'_{m, ti}$ and/or the current provisional mass measured value $X'_M \rightarrow X'_{M, ti}$. For example, with application of the aforementioned, internally of the measuring device electronics ascertained, measured values, the velocity measured value $X_v$ can be calculated using one of the formulas:

$$X_v = K_v \cdot \frac{X'_m}{X_\rho}, \tag{4}$$

$$X_v = K_v \cdot \frac{X_m}{X_\rho}, \tag{5}$$

$$X_v = K_v \cdot \frac{X'_M}{\Delta T_M \cdot X_\rho} \quad (6)$$

and/or $$X_v = K_v \cdot \frac{X_M}{\Delta T_M \cdot X_\rho} \quad (7)$$

in the measuring device electronics—also in real time—in sufficient accuracy for compensation of asymmetric dampings of the type being discussed. The measuring device parameter, $K_v$, applied in each case is a measuring device specific characteristic value, especially a measuring device specific characteristic value corresponding to an effective flow cross section of the measuring transducer, which moderates, on the one hand, between a velocity measured value $X_v$, which is ascertained in the supplying of the measuring transducer with a flowing medium of predetermined flow velocity, $v \rightarrow v_{DESIRED}$, and, on the other hand, the flow velocity predetermined therefor. The measuring device parameter, $K_v$, can, for example, be earlier experimentally ascertained during a calibration of the in line measuring device—in the laboratory and/or on-site—and stored in suitable manner, for example, also grouped according to typical cases of application, in the measuring device electronics, for example, in the non-volatile memory EEPROM of the mentioned microcomputer µC.

With application of the—currently ascertained and/or internally interim stored—velocity measured value, $X_v$, the measuring device parameter $K_{DI}$ can, for example, based on the formula:

$$K_{DI} \rightarrow K_{DI}(v) = \frac{K_{DI}}{X_v}, \quad (8)$$

be adapted by means of the measuring device electronics in very simple manner to the current medium, or to the current process situation. This matching of the measuring device parameter, $K_{DI}$, is, in the case of taking into consideration current flow velocities, only modified slightly, by causing the current velocity measured value, $X_v$, to enter according to aforementioned formula into the calibration calculation.

Especially for the already mentioned case, in which the in line measuring device is so installed, that the longitudinal axis L of the measuring transducer is oriented essentially vertically, it can be of advantage in the case of possible loading of the medium with an impurity, whose density and/or its viscosity deviates in considerable measure from that of the actual medium, to calculate the damping value, $X_{DI}$, of first type also taking into consideration a relative velocity between the medium and therein entrained impurities. For such purpose, the aforementioned formula for calculating the measuring device parameter, $K_{DI}$, is to be modified slightly, so that the measuring device parameter, $K_{DI}$, is then calculated as follows:

$$K_{DI} = \frac{K_{DI}}{X_v + K_{v0}} \quad (9)$$

The therein introduced measuring device parameter, $K_{v0}$, is a media specific characteristic value, which represents a relative velocity between medium and impurity as a result of an accelerating force acting on the impurity, such as, for instance, gravitation, or a buoyancy, or its effect on an effective flow velocity for the measuring as a whole or on average over time, and results practically directly from the medium to be measured in connection with the type of impurities, at most, to be expected during operation, such as, for instance, possibly entrained air, out-gassed carbon dioxide, required entrained additives or other inhomogeneities. The actually required measuring device parameter, $K_{v0}$, can, consequently, likewise be selected by the user interacting with the in line measuring device from an earlier provided parameter set held in the measuring device electronics, for example, in the course of start-up and/or a recalibration of the installed in line measuring device.

As recognizable directly from the above explanations, an advantage of the invention is, among other things, that the damaging influence of asymmetric dampings as a result of inhomogeneities for highly precise measurements of flowing media can, on the one hand, be largely compensated with application of few, very simply determined, correction factors. On the other hand, this can, for example, also occur with application of exclusively internally ascertained measured data of the in line measuring device and additionally also with only a very small additional calculative effort. In such case, all the information required for the compensation can be won also by means of conventional measuring transducers as well as by means of conventional circuit technology. Both with respect to the mechanical construction of the in line measuring device, especially also the measuring transducer, as well as also with respect to the circuit technology, the in line measuring device of the invention, thus, can be a quite conventional in line measuring device of the type being discussed, for example, also one according to the initially mentioned state of the art and/or also one, which is already established for application in filling processes and which has proved itself as suitable; required are only small changes of the evaluating programs running in the microcomputer of the measuring device electronics and, associated therewith, in the program code correspondingly representing these. The few measuring device parameters $K_1$, $K_{DI}$, $K_v$, $K_{v0}$, etc. required, in given cases, for calculating the respective measured values can be experimentally ascertained earlier in manner executable by those skilled in the art by wet calibration, for example, in a calibration laboratory and/or by means of the installed in line measuring device on-site, and are for typical application cases, or also equally applied equal type in line measuring devices, quite universally applicable. In consideration thereof, the present invention can also be retrofitted into already installed in line measuring devices of the type being discussed, to the extent that their particular measuring device electronics is correspondingly programmable.

The invention claimed is:

1. An in line measuring device, especially a Coriolis mass flow/density measuring device and/or a Coriolis mass flow/viscosity measuring device, for a flowable medium, especially a medium which is, at least at times, two- or multiphase and/or which contains impurities, such as, for instance, gas bubbles and/or solid particles, comprising:

a measuring transducer of the vibration-type, having at least one measuring tube vibrating, at least at times, during operation, especially performing bending oscillations, and serving for conveying flowable medium, especially medium which is, at least at times, two- or multiphase and/or which contains impurities, an exciter mechanism acting on said at least one measuring tube, especially an exciter mechanism acting centrally on said measuring tube, for producing vibrations, especially bending oscillations, of said at least one measuring tube, and a sensor arrangement for registering vibrations, especially bending oscillations, of said at least one measuring tube, which delivers at least one oscillation measurement signal representing oscillations, especially bending oscillations, of said at least one measuring tube; and measuring device electronics electrically coupled with said at least one measuring transducer, wherein:

at least at times, said measuring device electronics delivers at least one exciter signal, especially an exciter signal having a periodically variable and/or impressed electrical current, driving said exciter mechanism; and at least at times, during operation, said measuring device electronics ascertains a damping value of first type, especially by means of the at least one oscillation measurement signal and/or by means of the at least one exciter signal, especially periodically and/or, with a predetermined updating rate, recurringly, ascertains a damping value of first type, which represents a change within a predeterminable time interval, of damping opposing the vibrations of said at least one measuring tube, especially corresponding to a change of a spatial distribution of inhomogeneities, such as, for instance, gas bubbles and/or solid particles, in the medium flowing through said at least one measuring tube and/or a change of the concentration of inhomogeneities, such as, for instance, gas bubbles and/or solid particles, in the medium flowing through said at least one measuring tube.

2. The in line measuring device as claimed in claim 1, wherein:
said measuring device electronics recurringly generates the damping value of first type with a predetermined updating rate, especially an updating rate, which is essentially constant during a period of time, extending over a number of measuring cycles.

3. The in line measuring device as claimed in claim 1, wherein:
said measuring device electronics ascertains the damping value of first type taking into consideration a flow velocity of the medium, especially an instantaneous flow velocity and/or a flow velocity averaged over time.

4. The in line measuring device as claimed in claim 1, wherein:
said measuring device electronics, during operation, at least at times, internally provides at least one density measured value, which represents a density, of the medium conveyed within said at least one measuring tube, especially a density measured value ascertained by means of the at least one oscillation measurement signal and/or by means of the exciter signal, ascertained, at least at times, especially periodically recurringly.

5. The in line measuring device as claimed in claim 1, wherein:
said measuring device electronics, during operation, at least at times, internally stores at least one velocity measured value, which represents a flow velocity, of the medium conveyed within said at least one measuring tube, especially a velocity ascertained, at least at times, by means of the at least one oscillation measurement signal and/or by means of the exciter signal, especially an instantaneous velocity and/or a velocity averaged over time.

6. The in line measuring device as claimed in claim 5, wherein:
said measuring device electronics, during operation, recurringly ascertains the at least one velocity measured value by means of the at least one oscillation measurement signal and/or by means of the exciter signal.

7. The in line measuring device as claimed in claim 4, wherein:
said measuring device electronics generates the at least one velocity measured value by means of the at least one density measured value type.

8. The in line measuring device as claimed in claim 1, wherein:
said measuring device electronics during operation, especially periodically, recurringly ascertains by means of the at least one oscillation measurement signal an oscillation measured value, which represents an oscillation amplitude of oscillations, especially bending oscillations, of said at least one vibrating measuring tube and/or an effective value thereof.

9. The in line measuring device as claimed in claim 1, wherein:
said at least one measuring tube is excited, during operation, at least at times, driven by said exciter mechanism actuated by means of the at least one exciter signal to vibrations in a wanted mode of said measuring transducer, in which it executes, at least partially, especially predominantly and/or symmetrically with reference to an imaginary central plane of said at least one measuring tube coplanar with a cross section of said at least one measuring tube, bending oscillations about an imaginary bending oscillation axis of said measuring transducer, which extends essentially parallel to an imaginary longitudinal axis of said measuring transducer imaginarily connecting an inlet end of said at least one measuring tube with an outlet end of said at least one measuring tube or which coincides with such.

10. The in line measuring device as claimed in claim 9, wherein:
said exciter mechanism causes said at least one measuring tube during operation, at least at times, to execute bending oscillations around the imaginary bending oscillation axis, especially predominantly at a lowest resonance frequency of said at least one measuring tube, which are developed essentially symmetrically with respect to the imaginary central plane of said at least one measuring tube.

11. The in line measuring device as claimed in claim 9, wherein:
said at least one measuring tube, vibrating in the wanted mode, oscillates under the influence of Coriolis forces induced in medium flowing through said at least one measuring tube, at least at times, in a Coriolis mode of said measuring transducer superimposed on the wanted mode, in which it, at least partially, especially predominantly, executes bending oscillations about the imaginary bending oscillation axis of said measuring transducer antisymmetrically with reference to an imaginary central plane of said at least one measuring tube coplanar with a cross section of said at least one measuring tube.

12. The in line measuring device as claimed in claim 11, wherein:
the damping value of first type represents a damping, which opposes the bending oscillations corresponding to the Coriolis mode.

13. The in line measuring device as claimed in claim 1, wherein:
said measuring device electronics during operation, especially periodically, recurringly ascertains by means of the at least one oscillation measurement signal and/or by means of the exciter signal an excitation measured value, which represents an exciter force, especially an amplitude and/or an effective value of thereof, maintaining oscillations, especially bending oscillations, of said at least one measuring tube and/or which represents an excitation power maintaining oscillations, especially bending oscillations, of said at least one measuring tube.

14. The in line measuring device as claimed in claim 1, wherein:
said measuring device electronics, during operation, especially periodically and/or, with a predetermined updating rate, recurringly, ascertains a damping value of second type, especially by means of the at least one oscillation measurement signal and/or by means of the exciter signal, and especially also internally stores the damping value of second type, which represents, instantaneously, a damping of vibrations of said at least one measuring tube, especially of bending oscillations about an imaginary bending oscillation axis of said measuring transducer and/or in a wanted mode of said measuring transducer excited by means of said exciter mechanism, especially a damping variable in time and/or symmetric with reference to an imaginary central plane of said at least one measuring tube coplanar with a cross section of said at least one measuring tube and/or with reference to an imaginary line of action of an exciter force exerted on said at least one measuring tube during operation of said exciter mechanism under the influence of the exciter signal.

15. The in line measuring device as claimed in claim 14, wherein:
said measuring device electronics ascertains the damping value of second type based on a ratio, of the excitation measured value to the oscillation measured value ascertained during operation, especially periodically, recurringly.

16. The in line measuring device as claimed in claim 14, wherein:
said measuring device electronics ascertains the damping value of first type based on two or a plurality of damping values of second type ascertained during different measuring cycles.

17. The in line measuring device as claimed in claim 16, wherein:
said measuring device electronics ascertains the damping value of first type based on at least two damping values of second type, especially damping values of second type generated during different measuring cycles.

18. The in line measuring device as claimed in the preceding claim, wherein:
said measuring device electronics ascertains the damping value of first type based on a difference, of two damping values of second type generated during different measuring cycles.

19. The in line measuring device as claimed in claim 14, wherein:
said measuring device electronics ascertains the damping value of first type with application of a measuring device parameter, especially a measuring device parameter ascertained and/or internally stored during a calibration of the in line measuring device and/or, during operation, recurringly, especially based on the formula:

$$X_{DI} = K_{DI} \cdot \Delta X_{DII} = K_{DI} \cdot (X_{DII,t2} - X_{DII,t1}).$$

20. The in line measuring device as claimed in claim 19, wherein:
the measuring device parameter is a measuring device specific, characteristic value of the in line measuring device and/or a characteristic value of the in line measuring device dependent on the medium to be measured, especially a characteristic value of the in line measuring device ascertained in the case of medium flowing through said measuring transducer by means of said measuring device electronics and/or in dialog with a user interacting with the in line measuring device.

21. The in line measuring device as claimed in claim 14, wherein:
said measuring device electronics ascertains the damping value of first type based on at least one of the formulas:

$$X_{DI} = K_{DI} \cdot \Delta X_{DII}$$
$$= K_{DI} \cdot (X_{DII,t2} - X_{DII,t1})$$
$$= K_{DI} \cdot \left( \frac{X_{iexc,t2}}{X_{S1,t2}} - \frac{X_{iexc,t1}}{X_{S1,t1}} \right).$$

22. The in line measuring device as claimed in claim 19, wherein:
the measuring device parameter, especially a measuring device parameter dependent on the actual construction of said measuring transducer and/or on the medium, is a characteristic value of the in line measuring device ascertained during a wet calibration of the in line measuring device and/or, during operation, recurringly, especially a characteristic value ascertained in the case of supplying said measuring transducer with a medium of known and/or impressed mass flow rate, and/or in dialog with a user interacting with the in line measuring device.

23. The in line measuring device as claimed in claim 19, wherein:
said measuring device electronics ascertains the measuring device parameter in the case of supplying the measuring transducer with a medium of known and/or impressed mass flow rate, especially during a wet calibration of the in line measuring device on-site and/or, during operation, recurringly, especially in dialog with an interacting user.

24. The in line measuring device as claimed in claim 19, wherein:
said measuring device electronics ascertains the measuring device parameter based on the formula:

$$K_{DI} \rightarrow K_{DI}(v) = \frac{K_{DI}}{X_v}.$$

25. The in line measuring device as claimed in claim 1, wherein:
said measuring device electronics generates by means of the at least one oscillation measurement signal and/or by means of the exciter signal as well as by means of the damping value of first type, at least at times, especially periodically and/or, with a predetermined updating rate, recurringly, a mass measured value, which represents, instantaneously, a totaled mass flow, which corresponds to a mass of the medium to be measured, which flows through the measuring transducer during a time interval, especially a predetermined time interval and/or a time interval ascertained recurringly during operation.

26. The in line measuring device as claimed in claim 25, wherein:
said measuring device electronics generates by means of the at least one damping value of first type an alarm, which signals, that the mass measured value has a lessened accuracy of measurement, especially as a result of a quality of the medium differing from a corresponding specification.

27. The in line measuring device as claimed in claim 25, wherein:
the time interval, corresponds to a filling period extending from an operating point in time, corresponding to a starting point in time of a filling procedure up to an operating point in time, corresponding to an end point in time of the same filling procedure, especially corresponding to a predetermined amount of filling of the medium.

28. The in line measuring device as claimed in claim 27, wherein:
the damping represented by the damping value of first type corresponds to an antisymmetric damping of the vibrations of said at least one measuring tube totaled over the time interval.

29. The in line measuring device as claimed in claim 25, wherein:
said measuring device electronics generates by means of the at least one oscillation measurement signal and/or by means of the exciter signal, especially also by means of the damping value of first type, at least at times, especially periodically and/or with a predetermined updating rate, recurringly, at least one provisional mass measured value, which represents the mass to be measured less accurately than the actual mass measured value.

30. The in line measuring device as claimed in claim 29, wherein:
said measuring device electronics ascertains the at least one mass measured value also by means of the provisional mass measured value, especially based on the formula:

$$X_M = X'_M - K_m \cdot \frac{X_{DI}}{X_v}.$$

31. The in line measuring device as claimed in claim 1, wherein:
said measuring device electronics generates by means of the at least one oscillation measurement signal and/or by means of the exciter signal, especially also by means of the damping value of first type, at least at times, especially periodically and/or, with a predetermined updating rate, recurringly, at least one mass flow measured value, which represents, instantaneously, a mass flow rate, of the medium conveyed in said at least one measuring tube.

32. The in line measuring device as claimed in claim 31, wherein:
said measuring device electronics generates by means of the at least one damping value of first type an alarm, which signals, that the mass flow measured value has a lessened accuracy of measurement, especially as a result of a quality of the medium differing from a corresponding specification.

33. The in line measuring device as claimed in claim 31, wherein:
said measuring device electronics generates by means of the at least one oscillation measurement signal and/or by means of the exciter signal, especially also by means of the damping value of first type, at least at times, especially periodically and/or, with a predetermined updating rate, recurringly, a provisional mass flow measured value, which represents the mass flow rate, of the medium conveyed in said at least one measuring tube less accurately than the mass flow measured value.

34. The in line measuring device as claimed in claim 33, wherein:
said measuring device electronics generates the at least one mass flow measured value by means of the provisional mass flow measured value and by means of the damping value of first type, especially based on the formula:

$$X_m = X'_m - K_m \cdot \frac{X_{DI}}{X_v}.$$

35. The in line measuring device as claimed in claim 34, wherein:
said measuring device electronics ascertains the current mass measured value by means of a previously ascertained mass measured value as well as by means of a current provisional mass flow measured value, especially based on at least one of the formulas:

$$X_{M,i} = X_{M,i-1} + X'_{m,i} \cdot T_A - K_m \cdot \frac{X_{DI}}{X_v},$$

and/or $$X_{M,i} = X_{M,i-1} + X_{m,i} \cdot T_A.$$

36. The in line measuring device as claimed in claim 31, wherein:
said measuring device electronics generates the at least one mass measured value by means of the mass flow measured value and by means of the damping value of first type.

37. The in line measuring device as claimed in claim 5, wherein:
said measuring device electronics provides a measuring-device-specific, measuring device parameter, especially a measuring device parameter corresponding to an effective flow cross section of said measuring transducer and/or earlier ascertained during a calibration of the in line measuring device, moderating between, on the one hand, a velocity measured value, which is ascertained in the case of supplying said measuring transducer with a flowing medium of predetermined flow velocity, and, on the other hand, a predetermined flow velocity therefor.

38. The in line measuring device as claimed in claim 37, wherein:
said measuring device electronics ascertains the velocity measured value based on the formula:

$$X_v = K_v \cdot \frac{X_M}{\Delta T_M \cdot X_\rho} \text{ and/or}$$

based on the formula:

$$X_v = K_v \cdot \frac{X'_M}{\Delta T_M \cdot X_\rho}.$$

39. The in line measuring device as claimed in claim 38, wherein:
said measuring device electronics ascertains the measuring device parameter based on the formula:

$$K_{DI} \to K_{DI}(v) = \frac{K_{DI}}{X_v} = \frac{K_{DI}}{K_v \cdot \frac{X_M}{\Delta T_M \cdot X_\rho} + K_{v0}},$$

wherein $K_{V0}$ is a media parameter, which represents a relative velocity between medium and impurity, especially as a result of a buoyant force acting on the impurity.

40. The in line measuring device as claimed in claim 37, wherein:
said measuring device electronics ascertains the velocity measured value based on the formula:

$$X_v = K_v \cdot \frac{X'_m}{X_\rho}, \text{ and/or}$$

based on the formula:

$$X_v = K_v \cdot \frac{X_m}{X_\rho}.$$

41. The in line measuring device as claimed in claim 40, wherein:
said measuring device electronics ascertains the measuring device parameters based on the formula:

$$K_{DI} \to K_{DI}(v) = \frac{K_{DI}}{X_v}$$
$$= \frac{K_{DI}}{K_v \cdot \frac{X_m}{X_\rho} + K_{v0}}$$
$$= \frac{K_{DI}}{K_v \cdot \frac{X'_m}{X_\rho} + K_{v0}},$$

wherein $K_{V0}$ is a media parameter, which represents a relative velocity between medium and impurity, especially as a result of a buoyant force acting on the impurity.

42. The in line measuring device as claimed in claim 1, wherein:
said measuring device electronics ascertains the damping value of first type based on a derivative with respect to time of a damping of vibrations of said at least one measuring tube symmetric with reference to an imaginary central plane of said at least one measuring tube coplanar with a cross section of said at least one measuring tube and/or with reference to an imaginary line of action of an exciter force exerted on said at least one measuring tube, during operation, by said exciter mechanism under the influence of the exciter signal, especially damping of bending oscillations of said at least one measuring tube about an imaginary bending oscillation axis of said measuring transducer and/or in a wanted mode of said measuring transducer excited by means of said exciter mechanism.

43. The in line measuring device as claimed in claim 42, wherein:
said measuring device electronics, ascertains the damping value of first type based on a difference quotient, representing the time derivative of the symmetric damping.

44. The in line measuring device as claimed in claim 1, wherein:
said exciter mechanism includes an oscillation exciter, especially a single and/or electrodynamic, oscillation exciter, acting essentially centrally on said at least one measuring tube.

45. The in line measuring device as claimed in claim 1, wherein:
said measuring device electronics generates by means of the at least one damping value of first type an alarm, which signals, that the medium has a quality deviating from a corresponding specification, especially a maximum allowable fraction of entrained impurities.

46. The in line measuring device as claimed in claim 1, wherein:
said measuring device electronics generates by means of the at least one damping value of first type an alarm, which signals, that the in line measuring device is operating outside of a specification predetermined therefor.

47. The in line measuring device as claimed in claim 1, wherein:
the damping value of first type represents a damping, which is induced by medium conveyed in said at least one measuring tube and which opposes vibrations of said at least one measuring tube, which are antisymmetric with respect to an imaginary central plane of said at least one measuring tube coplanar with a cross section of said at least one measuring tube.

48. The in line measuring device as claimed in claim 1, wherein:
the damping value of first type represents a change of a damping with respect to time, which is induced by medium conveyed in said at least one measuring tube and opposes damping of vibrations of said at least one measuring tube, which are symmetric with respect to an imaginary central plane of said at least one measuring tube coplanar with a cross section said at least one measuring tube.

49. The use of an in line measuring device as claimed in claim 1 for control of a filling procedure serving for metering a predetermined amount and/or mass, of a medium into a containment, especially a bottle, a cup, a can, a glass, an ampoule or the like, and/or for ascertaining a filling period, required for metering a predetermined amount and/or mass, of a medium, extending from a starting point in time, of a corresponding filling procedure up to an an end point in time, of the same filling procedure, and/or for ascertaining an end point in time, of a filling procedure serving for metering a predetermined amount and/or mass, of a medium.

* * * * *